US012621825B2

(12) United States Patent
Sarkis et al.

(10) Patent No.: US 12,621,825 B2
(45) Date of Patent: May 5, 2026

(54) COMPACT SCHEDULING REQUESTS IN SIDELINK

(71) Applicant: QUALCOMM Incorporated, San Diego, CA (US)

(72) Inventors: Gabi Sarkis, San Diego, CA (US); Guangyi Liu, San Diego, CA (US); Tien Viet Nguyen, Bridgewater, NJ (US); Qing Li, Princeton Junction, NJ (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/544,707

(22) Filed: Dec. 7, 2021

(65) Prior Publication Data

US 2023/0180211 A1     Jun. 8, 2023

(51) Int. Cl.
*H04W 4/00*          (2018.01)
*H04W 72/02*        (2009.01)
(Continued)

(52) U.S. Cl.
CPC ....... *H04W 72/1263* (2013.01); *H04W 72/02* (2013.01); *H04W 72/23* (2023.01); *H04W 92/18* (2013.01)

(58) Field of Classification Search
CPC . H04W 72/1263; H04W 72/02; H04W 72/23; H04W 92/18; H04W 72/25; H04L 5/0092; H04L 5/0094; H04L 5/0053
See application file for complete search history.

(56) References Cited

U.S. PATENT DOCUMENTS

| | | | |
|---|---|---|---|
| 2018/0255532 A1* | 9/2018 | Li | H04W 88/04 |
| 2021/0298034 A1* | 9/2021 | He | H04W 72/12 |

(Continued)

FOREIGN PATENT DOCUMENTS

| | | | | |
|---|---|---|---|---|
| EP | | 3911003 A1 | 11/2021 | |
| WO | WO-2020006388 A1 * | 1/2020 | ........ | H04W 28/0268 |

(Continued)

OTHER PUBLICATIONS

W.-D. Shen and H.-Y. Wei, "Distributed V2X Sidelink Communications With Receiver Grant MAC Design," in IEEE Transactions on Vehicular Technology, vol. 71, No. 5, pp. 5415-5429, May 2022 (Year: 2022).*

(Continued)

*Primary Examiner* — Thai Dinh Hoang
(74) *Attorney, Agent, or Firm* — QUALCOMM Incorporated

(57) ABSTRACT

Methods, systems, and devices for wireless communications are described. A user equipment (UE) to be scheduled by a scheduler UE in a sidelink system may transmit a first scheduling request (SR) to request sidelink resources. The UE may transmit the first SR via a set of feedback resources. The scheduler UE may transmit, to the UE, a sidelink control message to schedule a sidelink transmission. The sidelink control message may indicate a set of feedback resources mapped to the sidelink transmission. The UE may transmit the scheduled sidelink transmission based on the sidelink control message and may request additional sidelink resources. The UE may transmit a second SR, where the second SR is transmitted via the set of feedback resources mapped to the sidelink transmission.

30 Claims, 13 Drawing Sheets

(51) Int. Cl.
  *H04W 72/1263*      (2023.01)
  *H04W 72/23*       (2023.01)
  *H04W 92/18*       (2009.01)

(56)          References Cited

U.S. PATENT DOCUMENTS

2022/0070847 A1 *   3/2022  Yoshioka ................. H04W 4/40
2022/0110104 A1 *   4/2022  Li ......................... H04L 1/1812
2023/0180211 A1 *   6/2023  Sarkis ................... H04W 72/02
                                              370/329

FOREIGN PATENT DOCUMENTS

WO     WO-2021263283 A1 * 12/2021   ............ H04W 64/00
WO     WO-2022046323 A1   3/2022
WO     WO-2022094506 A1 *  5/2022   .............. H04W 4/40

OTHER PUBLICATIONS

International Search Report and Written Opinion—PCT/US2022/
080640—ISA/EPO—Apr. 18, 2023 (2107295WO).

* cited by examiner 115-d 115-e

Sidelink Configuration Message
405

Sidelink Message
410

415
SR Via Set Of Feedback Resources

Sidelink Grant
420

Sidelink Communications
425

400

510

520

515

505

500

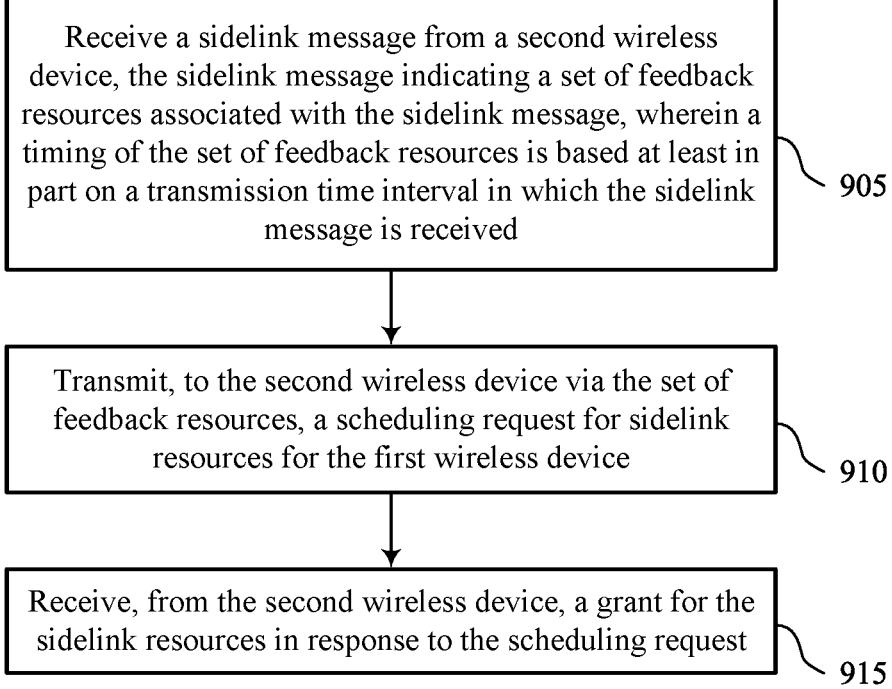

Receive a sidelink message from a second wireless device, the sidelink message indicating a set of feedback resources associated with the sidelink message, wherein a timing of the set of feedback resources is based at least in part on a transmission time interval in which the sidelink message is received

905

Transmit, to the second wireless device via the set of feedback resources, a scheduling request for sidelink resources for the first wireless device

910

Receive, from the second wireless device, a grant for the sidelink resources in response to the scheduling request

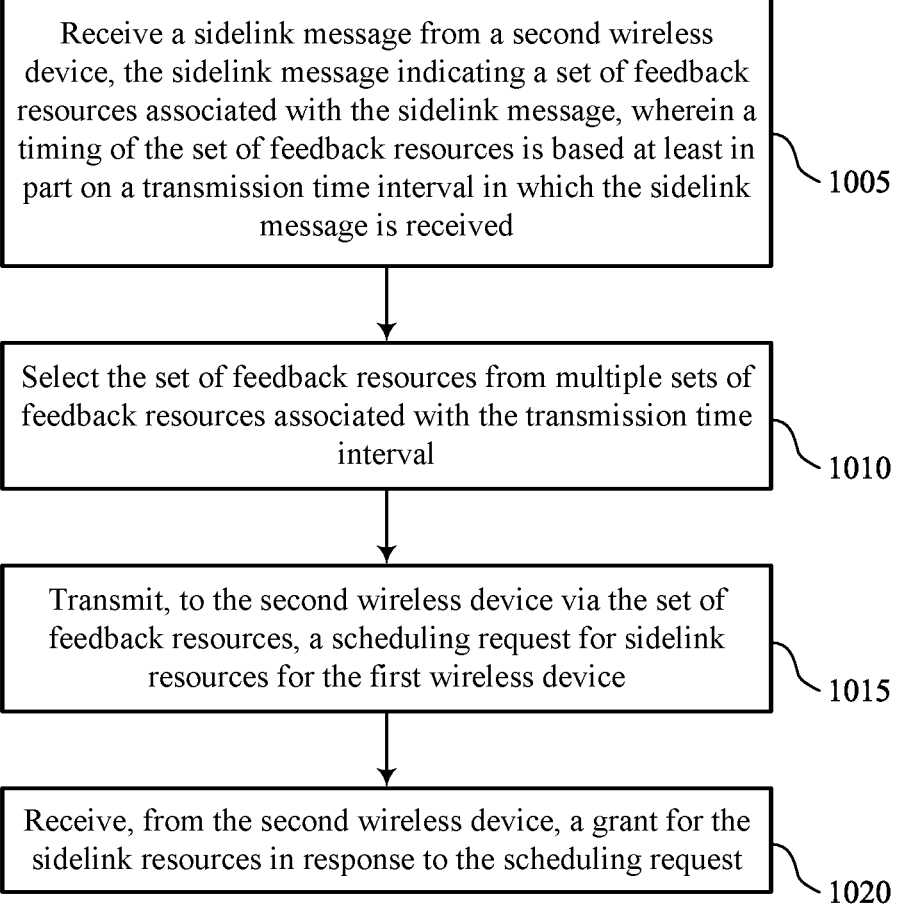

Receive a sidelink message from a second wireless device, the sidelink message indicating a set of feedback resources associated with the sidelink message, wherein a timing of the set of feedback resources is based at least in part on a transmission time interval in which the sidelink message is received

1005

Select the set of feedback resources from multiple sets of feedback resources associated with the transmission time interval

1010

Transmit, to the second wireless device via the set of feedback resources, a scheduling request for sidelink resources for the first wireless device

1015

Receive, from the second wireless device, a grant for the sidelink resources in response to the scheduling request

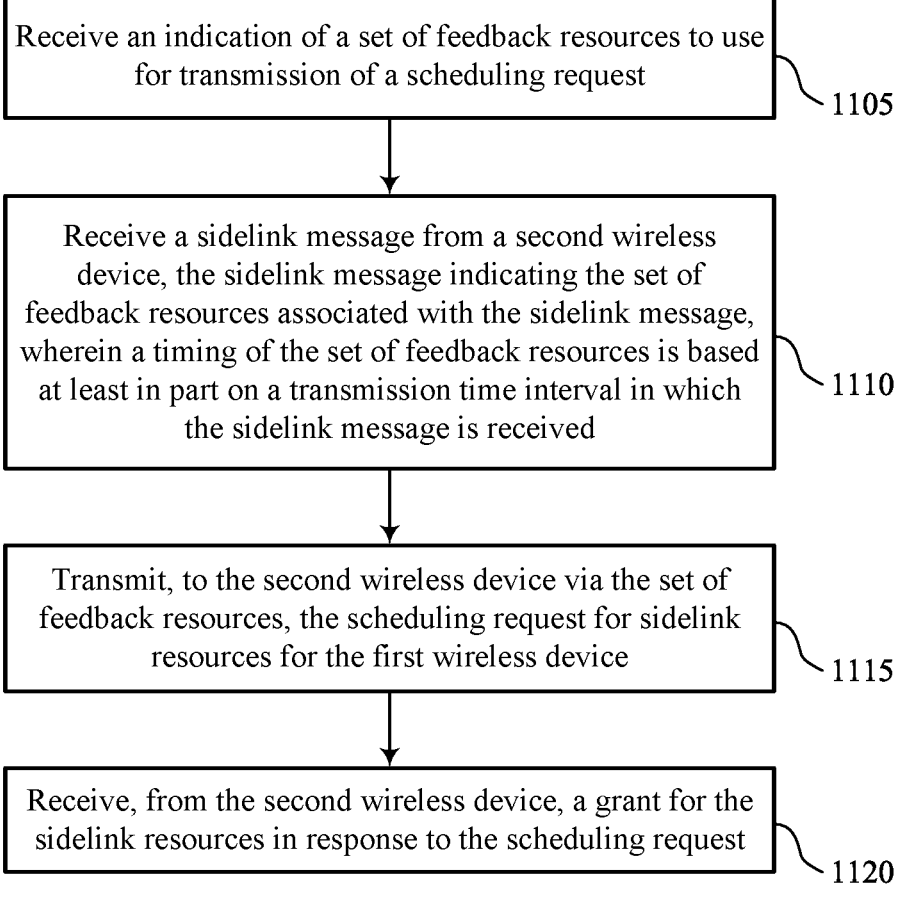

Receive an indication of a set of feedback resources to use for transmission of a scheduling request

1105

Receive a sidelink message from a second wireless device, the sidelink message indicating the set of feedback resources associated with the sidelink message, wherein a timing of the set of feedback resources is based at least in part on a transmission time interval in which the sidelink message is received

1110

Transmit, to the second wireless device via the set of feedback resources, the scheduling request for sidelink resources for the first wireless device

1115

Receive, from the second wireless device, a grant for the sidelink resources in response to the scheduling request

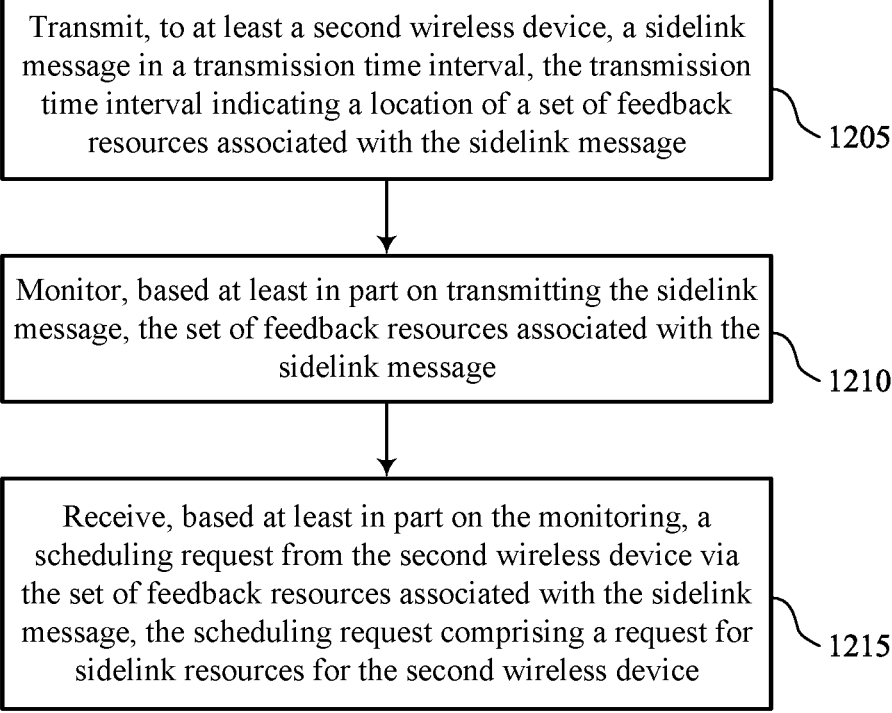

Transmit, to at least a second wireless device, a sidelink message in a transmission time interval, the transmission time interval indicating a location of a set of feedback resources associated with the sidelink message ⟋ 1205

Monitor, based at least in part on transmitting the sidelink message, the set of feedback resources associated with the sidelink message ⟋ 1210

Receive, based at least in part on the monitoring, a scheduling request from the second wireless device via the set of feedback resources associated with the sidelink message, the scheduling request comprising a request for sidelink resources for the second wireless device ⟋ 1215

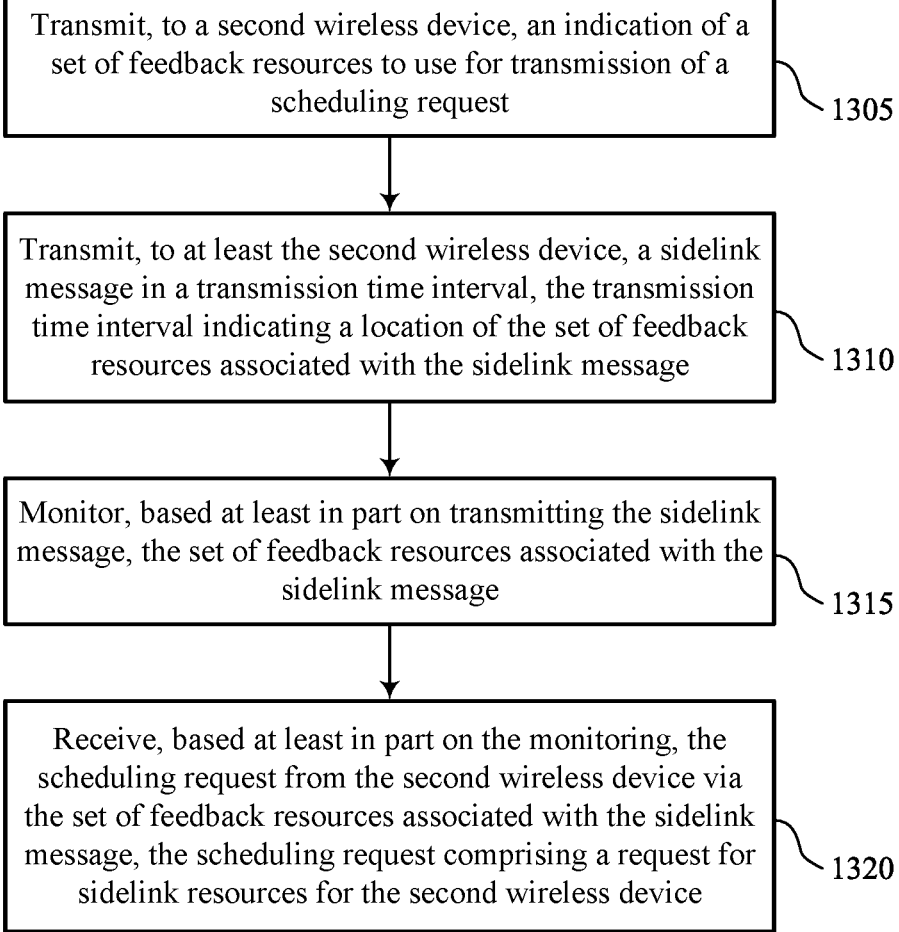

Transmit, to a second wireless device, an indication of a set of feedback resources to use for transmission of a scheduling request

1305

Transmit, to at least the second wireless device, a sidelink message in a transmission time interval, the transmission time interval indicating a location of the set of feedback resources associated with the sidelink message

1310

Monitor, based at least in part on transmitting the sidelink message, the set of feedback resources associated with the sidelink message

1315

Receive, based at least in part on the monitoring, the scheduling request from the second wireless device via the set of feedback resources associated with the sidelink message, the scheduling request comprising a request for sidelink resources for the second wireless device

COMPACT SCHEDULING REQUESTS IN SIDELINK

FIELD OF TECHNOLOGY

The following relates to wireless communications, including compact scheduling requests in sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Generally, the described techniques relate to procedures for compact scheduling requests (SRs) in sidelink systems. The procedures enable a user equipment (UE) to transmit an SR using feedback resources such as those that would have otherwise gone unused based on current techniques. For instance, a UE to be scheduled by a scheduler UE in a sidelink system may transmit a first SR to request sidelink resources. The UE may transmit the first SR via a set of feedback resources, such as feedback resources associated with a previous transmission. The scheduler UE may transmit, to the UE, a sidelink control message to schedule a sidelink transmission in response to the first SR. In some examples, the sidelink control message may indicate a set of feedback resources associated with (mapped to) the sidelink control message or the sidelink transmission scheduled by the sidelink control message. The UE may receive the sidelink control message and may transmit the scheduled sidelink transmission based on the sidelink control message. In some cases, the UE may request additional sidelink resources for sidelink communications. In these cases, the UE may transmit a second SR to the scheduler UE via the set of feedback resources associated with the sidelink control message or the sidelink transmission.

A method for wireless communications at a first wireless device is described. The method may include receiving a sidelink message from a second wireless device, the sidelink message indicating a set of feedback resources associated with the sidelink message, where a timing of the set of feedback resources is based on a transmission time interval (TTI) in which the sidelink message is received, transmitting, to the second wireless device via the set of feedback resources, an SR for sidelink resources for the first wireless device, and receiving, from the second wireless device, a grant for the sidelink resources in response to the SR.

An apparatus for wireless communications at a first wireless device is described. The apparatus may include a processor, memory coupled with the processor, and instructions stored in the memory. The instructions may be executable by the processor to cause the apparatus to receive a sidelink message from a second wireless device, the sidelink message indicating a set of feedback resources associated with the sidelink message, where a timing of the set of feedback resources is based on a TTI in which the sidelink message is received, transmit, to the second wireless device via the set of feedback resources, a SR for sidelink resources for the first wireless device, and receive, from the second wireless device, a grant for the sidelink resources in response to the SR.

Another apparatus for wireless communications at a first wireless device is described. The apparatus may include means for receiving a sidelink message from a second wireless device, the sidelink message indicating a set of feedback resources associated with the sidelink message, where a timing of the set of feedback resources is based on a TTI in which the sidelink message is received, means for transmitting, to the second wireless device via the set of feedback resources, a SR for sidelink resources for the first wireless device, and means for receiving, from the second wireless device, a grant for the sidelink resources in response to the SR.

A non-transitory computer-readable medium storing code for wireless communications at a first wireless device is described. The code may include instructions executable by a processor to receive a sidelink message from a second wireless device, the sidelink message indicating a set of feedback resources associated with the sidelink message, where a timing of the set of feedback resources is based on a TTI in which the sidelink message is received, transmit, to the second wireless device via the set of feedback resources, a SR for sidelink resources for the first wireless device, and receive, from the second wireless device, a grant for the sidelink resources in response to the SR.

Some examples of the method, apparatuses, and non-transitory computer-readable medium described herein may further include operations, features, means, or instructions for selecting the set of feedback resources from multiple sets of feedback resources associated with the TTI.

In some examples of the method, apparatuses, and non-transitory computer-readable medium described herein, selecting the set of feedback resources may include operations, features, means, or instructions for selecting the set of feedback resources based on an identifier of the first wireless device or an assignment configuration associated with the multiple sets of feedback resources.

In some examples of the method, apparatuses, and non-transitory computer-readable medium described herein, selecting the set of feedback resources may include operations, features, means, or instructions for selecting the set of feedback resources based on a periodicity associated with the first wireless device, a periodicity associated with the multiple sets of feedback resources, or both.

Some examples of the method, apparatuses, and non-transitory computer-readable medium described herein may further include operations, features, means, or instructions for receiving an indication of the set of feedback resources to use for transmission of the SR, where the SR may be transmitted via the set of feedback resources based on receiving the indication.

In some examples of the method, apparatuses, and non-transitory computer-readable medium described herein, receiving the indication of the set of feedback resources may include operations, features, means, or instructions for receiving the indication of the set of feedback resources via a PC5 message, a radio resource control (RRC) message, a medium access control (MAC) control element (MAC-CE), or any combination thereof.

In some examples of the method, apparatuses, and non-transitory computer-readable medium described herein, the indication of the set of feedback resources includes a second indication of a second set of feedback resources in a second TTI subsequent the set of feedback resources, the second set of feedback resources corresponding to a subsequent SR occasion for the first wireless device.

In some examples of the method, apparatuses, and non-transitory computer-readable medium described herein, transmitting the SR may include operations, features, means, or instructions for transmitting the SR according to a set of transmission parameters associated with the first wireless device, the set of feedback resources, or both.

Some examples of the method, apparatuses, and non-transitory computer-readable medium described herein may further include operations, features, means, or instructions for receiving an indication of the set of transmission parameters from the second wireless device via a PC5 message, an RRC message, a UE assistance framework message, or any combination thereof.

In some examples of the method, apparatuses, and non-transitory computer-readable medium described herein, the set of transmission parameters may be specific to the first wireless device or a set of wireless devices including the first wireless device.

In some examples of the method, apparatuses, and non-transitory computer-readable medium described herein, the set of transmission parameters includes a destination identifier, a packet delay budget, a priority level, a number of retransmissions, a transport block size, a number of sub-channels, or any combination thereof.

In some examples of the method, apparatuses, and non-transitory computer-readable medium described herein, the set of feedback resources may be allocated to a set of wireless devices including the first wireless device.

In some examples of the method, apparatuses, and non-transitory computer-readable medium described herein, the sidelink message includes a second grant for second sidelink resources for the first wireless device, a data message for the first wireless device, a trigger for the SR, or any combination thereof.

A method for wireless communications at a first wireless device is described. The method may include transmitting, to at least a second wireless device, a sidelink message in a TTI, the TTI indicating a location of a set of feedback resources associated with the sidelink message, monitoring, based on transmitting the sidelink message, the set of feedback resources associated with the sidelink message, and receiving, based on the monitoring, a SR from the second wireless device via the set of feedback resources associated with the sidelink message, the SR including a request for sidelink resources for the second wireless device.

An apparatus for wireless communications at a first wireless device is described. The apparatus may include a processor, memory coupled with the processor, and instructions stored in the memory. The instructions may be executable by the processor to cause the apparatus to transmit, to at least a second wireless device, a sidelink message in a TTI, the TTI indicating a location of a set of feedback resources associated with the sidelink message, monitor, based on transmitting the sidelink message, the set of feedback resources associated with the sidelink message, and receive, based on the monitoring, a SR from the second wireless device via the set of feedback resources associated with the sidelink message, the SR including a request for sidelink resources for the second wireless device.

Another apparatus for wireless communications at a first wireless device is described. The apparatus may include means for transmitting, to at least a second wireless device, a sidelink message in a TTI, the TTI indicating a location of a set of feedback resources associated with the sidelink message, means for monitoring, based on transmitting the sidelink message, the set of feedback resources associated with the sidelink message, and means for receiving, based on the monitoring, a SR from the second wireless device via the set of feedback resources associated with the sidelink message, the SR including a request for sidelink resources for the second wireless device.

A non-transitory computer-readable medium storing code for wireless communications at a first wireless device is described. The code may include instructions executable by a processor to transmit, to at least a second wireless device, a sidelink message in a TTI, the TTI indicating a location of a set of feedback resources associated with the sidelink message, monitor, based on transmitting the sidelink message, the set of feedback resources associated with the sidelink message, and receive, based on the monitoring, a SR from the second wireless device via the set of feedback resources associated with the sidelink message, the SR including a request for sidelink resources for the second wireless device.

In some examples of the method, apparatuses, and non-transitory computer-readable medium described herein, monitoring the set of feedback resources may include operations, features, means, or instructions for monitoring the set of feedback resources of multiple sets of feedback resources associated with the TTI based on an identifier of the second wireless device or an assignment configuration associated with the multiple sets of feedback resources.

In some examples of the method, apparatuses, and non-transitory computer-readable medium described herein, monitoring the set of feedback resources may include operations, features, means, or instructions for monitoring the set of feedback resources of multiple sets of feedback resources associated with the TTI based on a periodicity associated with the second wireless device, a periodicity associated with the multiple sets of feedback resources, or both.

Some examples of the method, apparatuses, and non-transitory computer-readable medium described herein may further include operations, features, means, or instructions for transmitting, to the second wireless device, an indication of the set of feedback resources to use for transmission of the SR, where the SR may be received via the set of feedback resources based on the indication.

In some examples of the method, apparatuses, and non-transitory computer-readable medium described herein, transmitting the indication may include operations, features, means, or instructions for transmitting the indication of the set of feedback resources via a PC5 message, an RRC message, a medium access control (MAC) control element (MAC-CE), or any combination thereof.

In some examples of the method, apparatuses, and non-transitory computer-readable medium described herein, the indication of the set of feedback resources includes a second indication of a second set of feedback resources in a second TTI subsequent the set of feedback resources, the second set of feedback resources corresponding to a subsequent SR occasion for the second wireless device.

Some examples of the method, apparatuses, and non-transitory computer-readable medium described herein may further include operations, features, means, or instructions for receiving the SR according to a set of transmission parameters associated with the second wireless device, the set of feedback resources, or both.

Some examples of the method, apparatuses, and non-transitory computer-readable medium described herein may further include operations, features, means, or instructions for transmitting an indication of the set of transmission parameters from the second wireless device via a PC5 message, an RRC message, a UE assistance framework message, or any combination thereof.

In some examples of the method, apparatuses, and non-transitory computer-readable medium described herein, the set of transmission parameters includes a destination identifier, a packet delay budget, a priority level, a number of retransmissions, a transport block size, a number of sub-channels, or any combination thereof.

In some examples of the method, apparatuses, and non-transitory computer-readable medium described herein, the set of feedback resources may be allocated to a set of wireless devices including the second wireless device.

In some examples of the method, apparatuses, and non-transitory computer-readable medium described herein, the sidelink message includes a second grant for second sidelink resources for the second wireless device, a data message for the second wireless device, a trigger for the SR, or any combination thereof.

BRIEF DESCRIPTION OF THE DRAWINGS

FIGS. 9 through 13 show flowcharts illustrating methods that support compact SRs in sidelink in accordance with aspects of the present disclosure.

DETAILED DESCRIPTION

Figure 1:
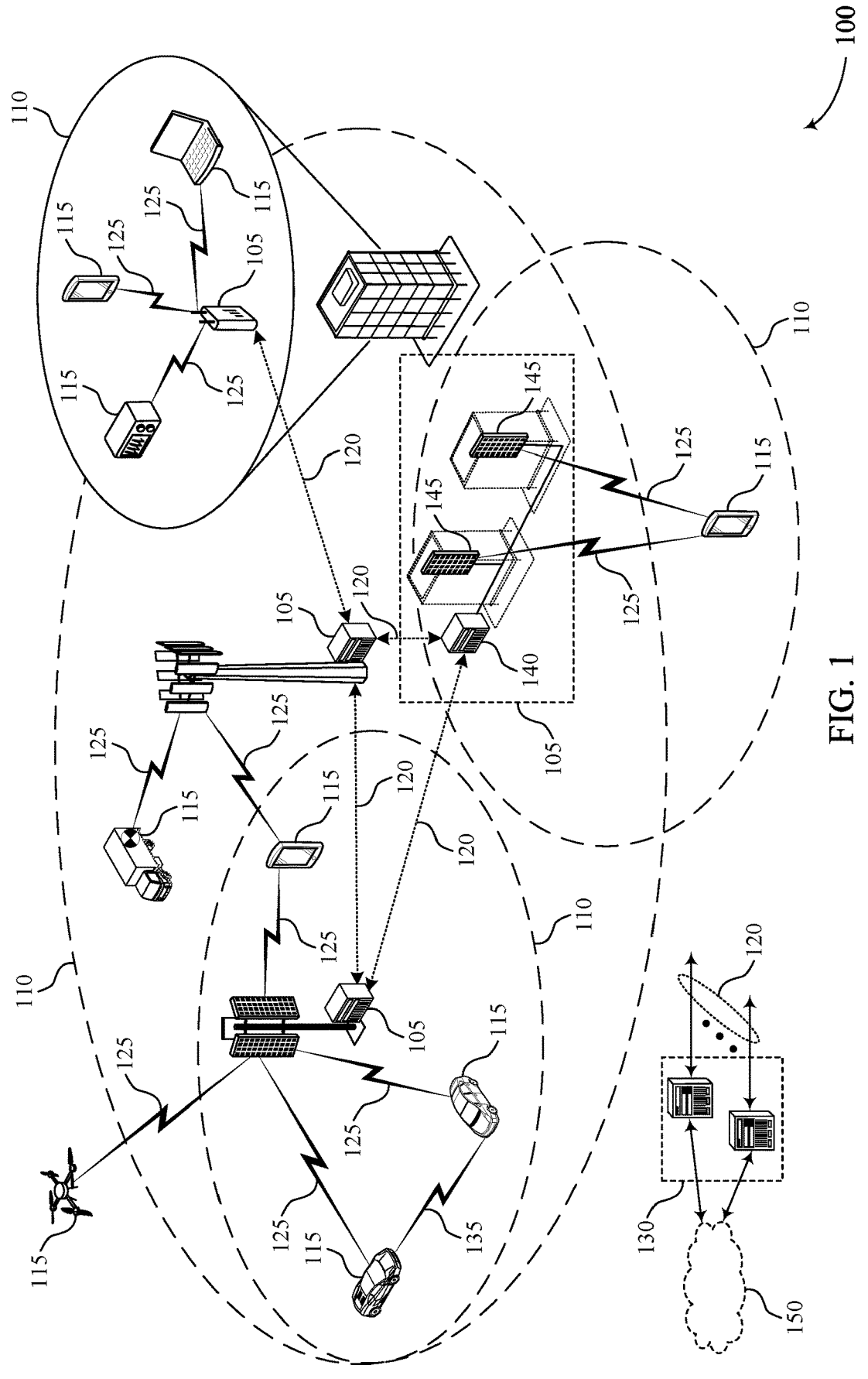
FIGS. 1 through 3B illustrate examples of a wireless communications system that supports compact SRs in sidelink in accordance with aspects of the present disclosure.

Wireless communications systems may support sidelink communications in which UEs may utilize sidelink resources for communicating with each other. Rather than relying on a network node such as a base station, some sidelink systems may support a UE that acts as a scheduler for other (e.g., surrounding) UEs. In such cases, one or more surrounding UEs may send scheduling requests (SRs) to the scheduler UE requesting resources for sidelink communications. The scheduler UE may transmit a grant that indicates sidelink resources and feedback resources for the surrounding UE(s) to use for sidelink communications. The feedback resources may be based on a mapping of the sidelink resources that are allocated for transmission and sets of resources of a physical sidelink feedback channel (PSFCH). One or more other UEs may provide feedback for the sidelink communications using the feedback resources or may request additional resources (e.g., transmit an SR) for sidelink communications. However, current techniques do not support a procedure for allocating resources to be used by a UE for transmitting SRs to a scheduler UE in sidelink communication. Additionally, due to the feedback resource mapping, some feedback resources may be left unused, which may lead to inefficient use of network resources.

The techniques described herein provide a procedure for compact SRs in sidelink systems. The techniques enable a UE to transmit an SR using feedback resources such as those that would have otherwise gone unused based on current techniques. For instance, a UE to be scheduled by a scheduler UE in a sidelink system may transmit a first SR to request sidelink resources. The UE may transmit the first SR via a set of feedback resources, such as feedback resources associated with a previous transmission. The scheduler UE may transmit, to the UE, a sidelink control message to schedule a sidelink transmission in response to the first SR. In some examples, the sidelink control message may indicate a set of feedback resources associated with (mapped to) the sidelink control message or the sidelink transmission scheduled by the sidelink control message. The UE may receive the sidelink control message and may transmit the scheduled sidelink transmission based on the sidelink control message. In some cases, the UE may request additional sidelink resources for sidelink communications. In these cases, the UE may transmit a second SR to the scheduler UE via the set of feedback resources associated with the sidelink control message or the sidelink transmission. In some examples, the set of feedback resources allocated for use for SR transmission may be configured, preconfigured, or assigned by the scheduler UE. In some cases, the number of feedback resources in the set of feedback resources used by the UE for SR transmission may be dynamic or static.

Aspects of the disclosure are initially described in the context of wireless communications systems. Aspects are then described with respect to a subsystem diagram and a process flow. Aspects of the disclosure are further illustrated by and described with reference to apparatus diagrams, system diagrams, and flowcharts that relate to compact SRs in sidelink.

FIG. 1 illustrates an example of a wireless communications system 100 that supports compact SRs in sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, wireless communications system 100 may support one or more communications modes. In one case, a communications mode may support scheduling of a UE 115 by a base station 105. For example, in a communications mode 1, a UE 115 may transmit an SR to a base station 105, where the SR may include a bitmap as part of an uplink control information (UCI) on a physical uplink control channel (PUCCH). The SR may be configured according to an SR configuration of a set of SR configurations provided to the UE 115 (e.g., transmitted to the UE 115 from the base station 105), where the bitmap may indicate the SR configuration. In some cases, the UE 115 may transmit a buffer status report (BSR) to the base station 105 over a Uu link (e.g., communication link 125), which may be included in the SR transmission or in a separate message. The BSR may be transmitted as part of a MAC control element (MAC-CE) with the following information: a destination index, a logical channel group (LCG) ID, and a buffer size. The destination index may be in a field (e.g., v2x-DestinationInfoList) as a five bit index. The LCG ID may include a three bit LCG ID and the buffer size may include an eight bit index in a table of data volume values. In some cases, the destination index and the LCG ID may indicate a quality of service, latency, and reliability information of the UE 115, and the buffer size may indicate an amount of data the UE 115 may send.

In some cases, the wireless communications systems 100 may support sidelink communications in which a UE 115 may serves as a central scheduler for other UEs 115 for sidelink communications rather than a base station 105 acting as the central scheduler. Supporting the scheduler UE 115 may realize one or more of the following potential benefits. The scheduler UE 115 may help to manage congestion and mitigate potential conflicts with simultaneous transmissions for half-duplex UEs 115. The scheduler UE 115 may improve quality of service (QoS) enforcement (e.g., by employing stricter QoS standards), efficiency of spectrum utilization, and channel access (e.g., by allowing for flexibility in scheduling).

Wireless communications system 100 may support compact SRs for sidelink communications. For example, wireless communications system 100 may enable a UE 115 to transmit an SR using feedback resources such as those that would have otherwise gone unused. Such techniques may also enable the determination of which PSFCH resources to use for sidelink SRs to ensure backward compatibility (e.g., with legacy devices). For instance, the UE 115 to be scheduled by a scheduler UE 115 in a sidelink system may transmit a first SR to request sidelink resources. The UE 115 may transmit the first SR via a set of feedback resources, such as feedback resources associated with a previous transmission. The scheduler UE 115 may transmit, to the UE 115, a sidelink control message to schedule a sidelink transmission in response to the first SR. In some examples, the sidelink control message may indicate a set of feedback resources associated with (mapped to) the sidelink control message or the sidelink transmission scheduled by the sidelink control message. The UE 115 may receive the sidelink control message and may transmit the scheduled sidelink transmission based on the sidelink control message. In some cases, the UE 115 may request additional sidelink resources for sidelink communications. In these cases, the UE 115 may transmit a second SR to the scheduler UE via the set of feedback resources associated with the sidelink control message or the sidelink transmission. While the examples used refer primarily to a UE, aspects of the present disclosure may be applied to wireless devices other than a UE (e.g., a road side unit, an IAB node, a vehicle, a network node).

Figure 2:
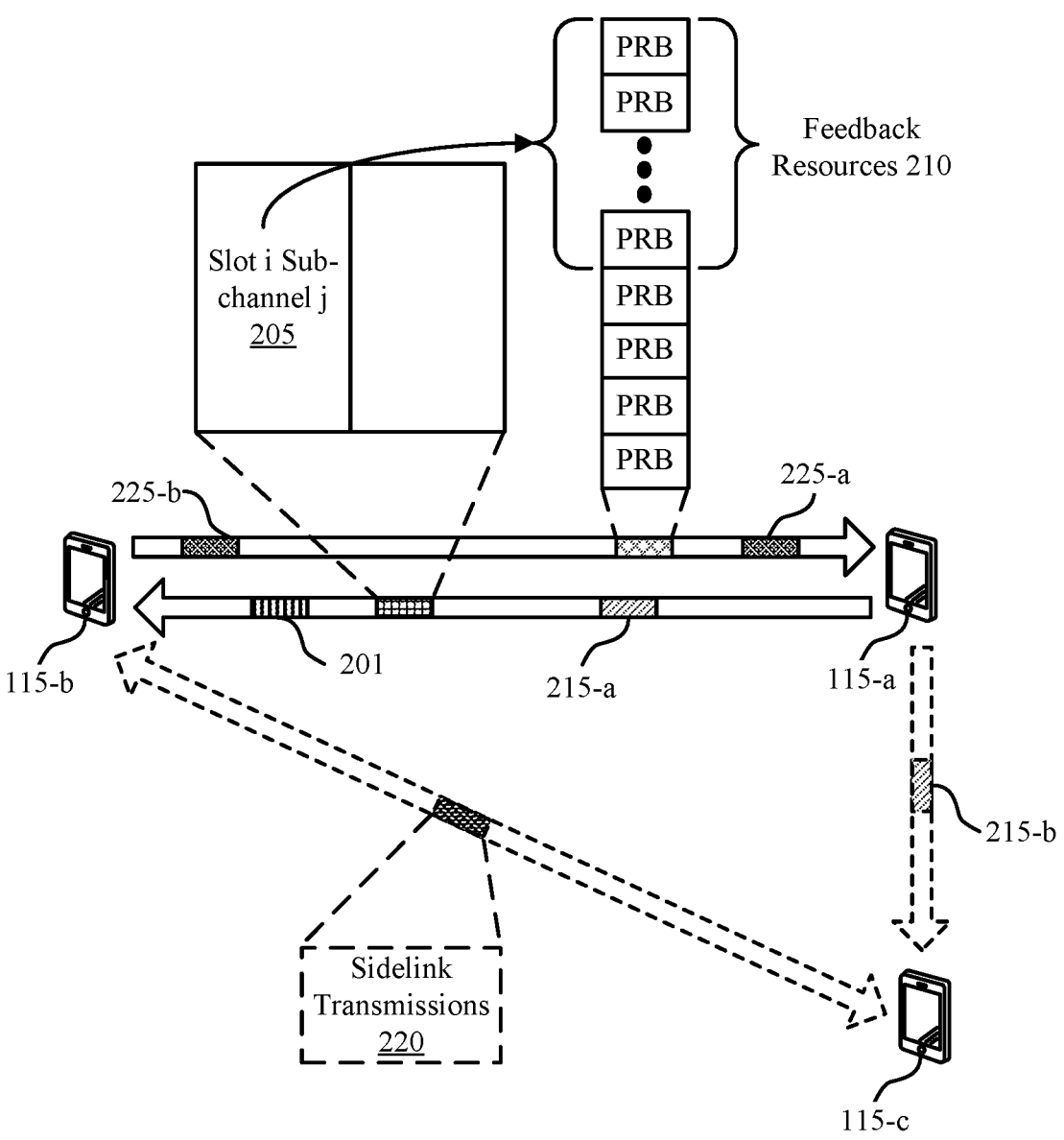

FIG. 2 illustrates an example of a wireless communications system 200 that supports procedures for compact SRs in sidelink in accordance with aspects of the present disclosure. In some examples, the wireless communications system 200 may implement aspects of the wireless communications system 100. The wireless communications system 200 may include a UE 115-a, UE 115-b, and a UE 115-c, which may be examples of a UE 115, as described herein with reference to FIG. 1. In some cases, the UE 115-a may be an example of a scheduler UE 115 and the UE 115-b and the UE 115-c may be examples of UEs 115 to be scheduled by the UE 115-a, as described herein with reference to FIG. 1. The UE 115-a may communicate with and schedule the UE 115-b, the UE 115-c, or both.

In some examples, the UE 115-a may be a scheduler or central scheduling device having the capability to schedule resources (e.g., sidelink resources or feedback resources) for the UE 115-b and the UE 115-c (e.g., for sidelink communications). For example, the UE 115-a may grant sidelink resources for sidelink communications for a UE 115-b. The UE 115-b may transmit a first SR 225-a to the UE 115-a to request resources for sidelink communications. The UE 115-a may transmit a sidelink control message 201 (a grant) using a sidelink channel to schedule the sidelink communications and indicate a set of resources to be used for the sidelink communications and feedback (e.g., a set of feedback resources 210) for the sidelink communications. In some cases, the indication may be transmitted via a PC5 message, an RRC message, a MAC-CE message, or any combination thereof. The UE 115-b may perform the sidelink communications using the set of feedback resources 210. In some cases, the UE 115-b may transmit the sidelink communications to the UE 115-a or other surrounding UEs (e.g., the UE 115-c). The UE 115-b may provide feedback for the sidelink communications using the set of feedback resources 210 and request additional resources for additional sidelink communications. The UE 115 may transmit (re-transmit) a grant (e.g., a first sidelink message 215-a) for the additional sidelink communications to provide the additional resources. In some cases, the sidelink communications may be a sidelink transmission, a retransmission, or multiple retransmissions.

In some cases, the UE 115-b may transmit feedback for the sidelink communications (e.g., physical sidelink shared channel (PSSCH) transmissions) over the set of feedback resources 210. The set of feedback resources 210 may be directly mapped to a location of a sidelink communication of the sidelink communications. For example, the UE 115-a may transmit a sidelink communication in a slot i and sub-channel j 205 to the UE 115-b. In some cases, the sidelink communication may start at or include the slot i and sub-channel j 205, where the set of feedback resources 210 may be mapped to any communication that starts at or includes the slot i and sub-channel j 205. In some examples, the sidelink communication may include a grant, a data transmission, an SR trigger, or any combination thereof.

Additionally, the set of feedback resources 210 may be associated with a set of resources of a PSFCH. In some examples, PSFCH symbols may be configured periodically or fully disabled in a resources pool. For example, PSFCH symbols may be configured for every slot, every two slots, or every four slots. In some cases, the PSFCH symbols may include a PSFCH symbol and the PSFCH symbol repeated on a previous symbol for automatic gain control (AGC) training. In some examples, the PSFCH symbols may be defined both in code (e.g., a cyclic shift) and frequency (e.g., an RB). For example, a PSFCH transmission may include an RB that uses a PUCCH format zero. The RB may carry HARQ acknowledgment (HARQ-ACK) information for a single PSSCH transmission that are cyclic shifted to distinguish ACKs from negative acknowledgments (NACKs). A cyclic shift zero and a cyclic shift six may be an ACK and NACK pair for a feedback resource, where the cyclic shift zero may include an ACK and the cyclic shift six may include a NACK. The PSFCH transmission may include six cyclic shift pairs per RB with ten RBs for feedback, resulting in sixty feedback resources.

In some cases, the UE 115-b may transmit a second SR 225-b on the set of feedback resources 210 associated with (mapped to) the sidelink communication (a previous communication) from the UE 115-a. For example, the UE 115-b may receive the sidelink communication from the UE 115-a in the slot i and sub-channel j 205. As the UE 115-a transmitted the sidelink communication in the slot i and sub-channel j 205, there may be a direct mapping to the set of feedback resources 210 (or a subset of the set of feedback resources 210). In some examples, the mapping may be an implicit mapping pre-configured (e.g., a default standard) or an explicit mapping configured by the UE 115-a (e.g., by the sidelink control message 201). Because there is a direct mapping between the sidelink communication sent to the UE 115-b and the set of feedback resources 210, the UE 115-c may determine that the set of feedback resources 210 are for another UE (e.g., the UE 115-b). For example, the UE 115-c may detect the sidelink control message 201 and, based on the detection, determine that the sidelink communication is for another UE. The UE 115-c may then avoid the set of feedback resources 210 that correspond to the sidelink communication because of the direct mapping. Thus, the UE 115-c may use other feedback resources for feedback (e.g., ACK and NACK). In this way, the UE 115-b may transmit the second SR 225-b on the set of feedback resources 210 mapped to the sidelink communication while the UE 115-c continues to use the other feedback resources for feedback. In some cases, the UE 115-c may represent a legacy UE, such that the direct mapping ensures that other UEs in a sidelink system, including legacy UEs, may avoid using the set of feedback resources 210 by following current procedures.

In some examples, the UE 115-b may transmit the first SR 225-a and the second SR 225-b according to one or more sets of transmission parameters associated with the UE 115-b. For example, the first SR 225-a (PSFCH resource) for the UE 115-b may be associated with a set of configured transmission parameters. The set of configured transmission parameters may include one or more of a destination ID (e.g., an ID associated with a device to which a packet is transmitted), a packet delay budget associated with one or more packets, a priority of a packet, a maximum number of retransmissions for a packet, an expected transport block (TB) size or expected allocation for a packet, and an expected number of sub-channels used for transmission of a packet. In some cases, the one or more sets of transmission parameters may be associated with the UE 115-b, the set of feedback resources, or both. The set of configured transmission parameters may be exchanged between the UE 115-b and the UE 115-a over PC5-RRC or using a UE assistance framework. For example, the UE 115-a may transmit an indication of the set of transmission parameters to the UE 115-b via a PC5 message, an RRC message, a UE assistance framework message, or any combination thereof. In some cases, the set of transmission parameters may be common to multiple UEs (e.g., the UE 115-b and the UE 115-c) or the set of transmission parameters may be per UE 115 (e.g., associated with a single UE 115).

In some cases, the UE 115-a may transmit a sidelink message (e.g., a grant) based on the second SR 225-b. For example, the UE 115-a may transmit the first sidelink message 215-a to the UE 115-b in response to the second SR 225-b. The first sidelink message 215-a may schedule sidelink transmissions 220 and indicate a set of sidelink transmission resources and a set of feedback resources. In some cases, the set of sidelink transmission resources may be used for sidelink transmissions 220 between the UE 115-b and the UE 115-c. The UE 115-a may transmit a second sidelink message 215-b (e.g., a grant) to the UE 115-c, in response to the second SR 225-b, to schedule the sidelink transmissions 220.

Figure 3A:
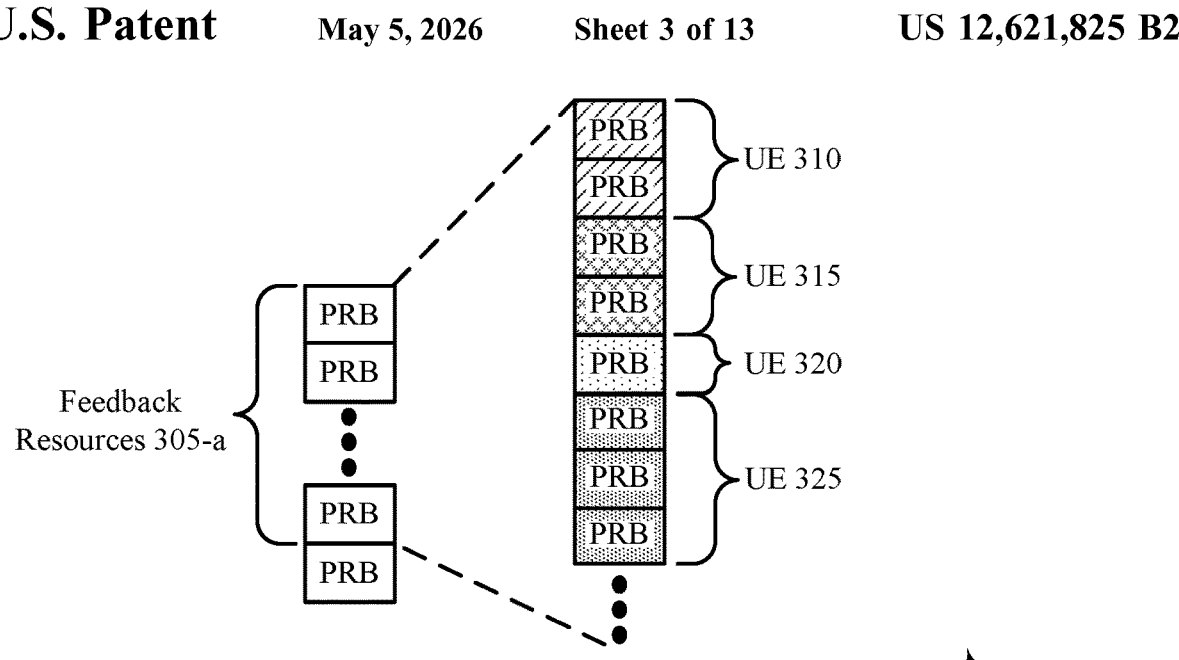
Figure 3B:
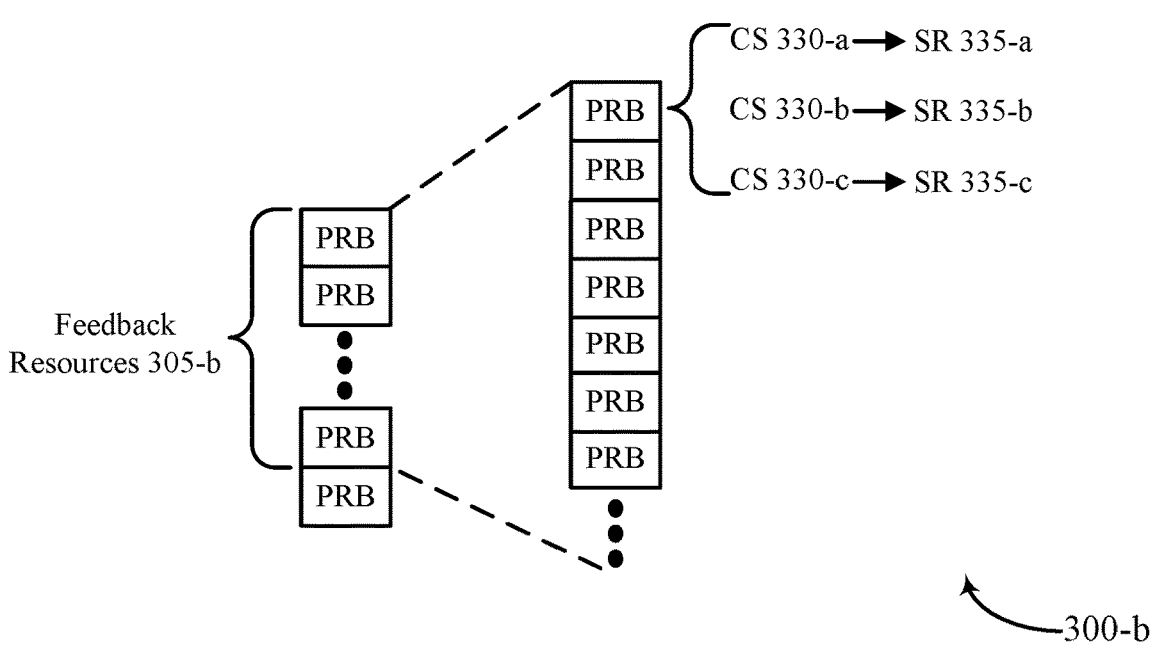

FIGS. 3A and 3B illustrates an example of a configuration 300-a and a configuration 300-b, respectively, that support compact SRs in sidelink in accordance with aspects of the present disclosure. In some examples, the configuration 300-a and the configuration 300-b may implement or be implemented by aspects of the wireless communications system 100 and the wireless communications system 200, as described in FIGS. 1 and 2. For example, one or more of the configuration 300-a and the configuration 300-b may be implemented by one or more UE(s) 115 to support compact SRs in sidelink.

In some examples, resources for SR (PSFCH resources) may be assigned to one or more UEs. The assignment could be by pre-configuration or from a scheduler UE (e.g., the UE 115-a as described with reference to FIG. 2). For example, a scheduler UE (such as UE 115-a in FIG. 2) may transmit a sidelink transmission to a UE, where the sidelink transmission may be a control message (grant), a data transmission, or an SR trigger. A set of feedback resources of multiple sets of feedback resources may be selected for the sidelink transmission and may be implicitly mapped or explicitly mapped to the sidelink transmission. In the case of implicit mapping, the SR (PSFCH resources) assignment may be periodic. For example, the UE may be pre-configured to select the set of feedback resources for the sidelink transmission based on a periodicity associated with the scheduler UE, a periodicity associated with the multiple sets of feedback resources, or both. In some examples, the periodicity may be every slot, every two slots, or every four slots. In the case of explicit mapping, the scheduler UE may provide SR (PSFCH resources) assignment for one or more subsequent SR occasion(s). For example, the scheduler UE may indicate the set of feedback resources that the UE may select from the multiple sets of feedback resources that correspond or map to the sidelink transmission.

In one example, the scheduler UE may configure an assignment associated with the multiple sets of feedback resources, such that the UE may be assigned the set of feedback resources from the multiple sets of feedback resources. In some cases, the resources for SR (PSFCH resources) in an RB may be assigned to one UE or assigned to multiple (different) UEs.

In the example of FIG. 3A, one or more physical RBs (PRBs) may be assigned to a single UE. For example, the feedback resources 305-a may include multiple PRBs. A first set of PRBs (e.g., two PRBs) may be assigned to a UE 310, A second set of PRBs may be assigned to a UE 315, a third set of PRBs (e.g., one PRB) may be assigned to a UE 320, a fourth set of PRBs (e.g., three PRBs) may be assigned to a UE 325, etc. The number of PRBs assigned to each UE may be dependent upon channel congestion, number of UEs, and more, and may be dynamically configured by the scheduler UE. While four different UEs were illustrated as an example, there may be one or more UEs assigned one or more PRBs in a set of feedback resources. In some cases, the feedback resources 305-a may represent feedback resources 210 as described with reference to FIG. 2.

In the example of FIG. 3B, a single PRB may be assigned to multiple UEs. For example, the feedback resources 305-b may include multiple PRBs. A first PRB may be assigned to multiple UEs (e.g., three different UEs) each with their own cyclic shift CS and SR. For example, an SR 335-a may be associated with a CS 330-a, an SR 335-b may be associated with a CS 330-b, and an SR 335-c may be associated with a CS 330-c. By using different CSs, the single PRB may include multiple SRs for multiple UEs. In some cases, the feedback resources 305-b may represent feedback resources 210 as described with reference to FIG. 2. In some examples, the configuration 300-a and the configuration 300-b may be used in a same set of feedback resources.

Figure 4:
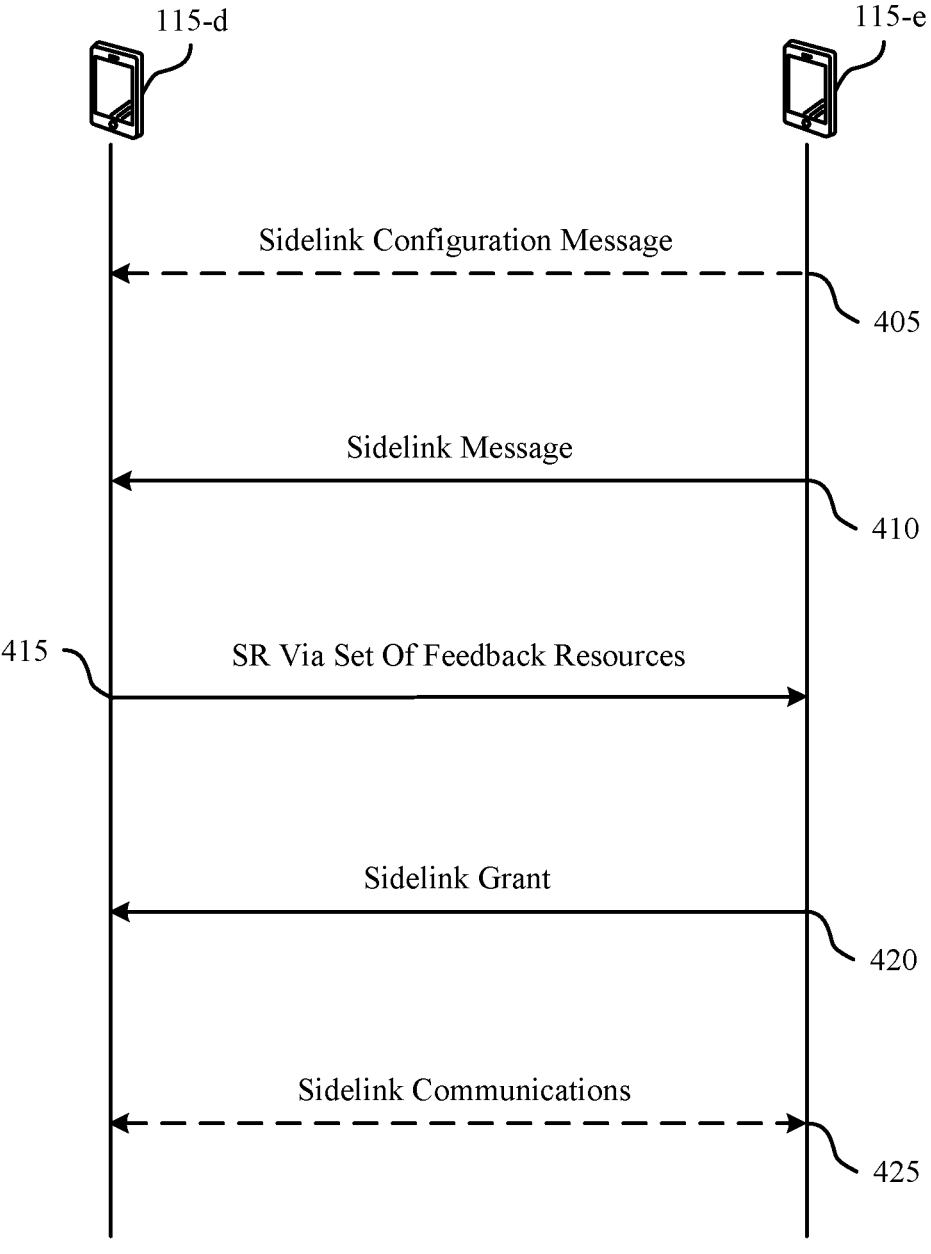
FIG. 4 illustrates an example of a process flow that supports compact SRs in sidelink in accordance with aspects of the present disclosure.
Figure 4:

FIG. 4 illustrates an example of a process flow 400 that supports procedures for compact SRs in sidelink in accordance with aspects of the present disclosure. The process flow 400 may include a UE 115-d and a UE 115-e, which may be examples of UEs 115 as described with reference to FIGS. 1-3. In some cases, the UE 115-e may be an example of a scheduler UE 115 and the UE 115-d may be an example of a UE 115 to be scheduled, where the UE 115-e and the UE 115-d may be in sidelink communication.

Optionally, at 405, the UE 115-e may transmit a sidelink configuration message to the UE 115-d. The sidelink configuration message may be an initial message to begin sidelink communications between the UE 115-e and the UE 115-d. In some cases, the sidelink configuration message may be a PC5-RRC message.

At 410, the UE 115-e may transmit a sidelink message to at least the UE 115-d. In some cases, the sidelink message may include a data message for the UE 115-d, a trigger for an SR, or any combination thereof. The sidelink message may be sent in a TTI, where the TTI indicates a location of a set of feedback resources associated with feedback for the sidelink message. In some examples, the set of feedback resources may be allocated to a set of UEs including the UE 115-d. In some cases, the set of feedback resources may be of multiple sets of feedback resources associated with the TTI. In some examples, the UE 115-d may select the set of feedback resources from the multiple sets of feedback resources based on a periodicity, an identifier of the UE 115-e, or an assignment configuration associated with the multiple sets of feedback resources.

In some cases, the periodicity may be associated with the UE 115-e, with the multiple sets of feedback resources, or both. For example, the UE 115-e may transmit sets of feedback resources every N number of slots. Additionally, or alternatively, the UE 115-e may transmit the feedback resources for the UE 115-d every $N^{th}$ set of the multiple sets of feedback resources. In some examples, the periodicity may be static, semi-static, or dynamically configured.

At 415, the UE 115-*d* may transmit the SR to the UE 115-*e*. The UE 115-*d* may send the SR via the set of feedback resources. In some cases, the sidelink message may indicate the set of feedback resources to use for transmission of the SR. The UE 115-*d* may receive the indication via a PC5 message, an RRC message, a MAC-CE message, or any combination thereof. In some examples, the indication may include a second indication of a second set of feedback resources in a second TTI subsequent to the set of feedback resources, where the second set of feedback resources corresponds to a subsequent SR. In some examples, the sidelink message may include a second grant for second sidelink resources for the UE 115-*d*.

In some examples, the UE 115-*d* may transmit the SR according to a set of transmission parameters associated with the UE 115-*d*, the set of feedback resources, or both. The set of transmission parameters may include a destination identifier, a packet delay budget, a priority level, a number of retransmissions, a transport block size, a number of sub-channels, or any combination thereof. The UE 115-*e* may transmit the set of transmission parameters via the sidelink configuration message, the sidelink message, or another sidelink message associated with the sidelink communication. In some cases, the UE 115-*e* may transmit an indication of the set of transmission parameters via a PC5 message, an RRC message, a UE assistance framework, or any combination thereof.

In some cases, the UE 115-*e* may monitor the set of feedback resources associated with feedback for the sidelink message. The monitoring may include monitoring for the SR based on the UE 115-*e* transmitting the sidelink message at 410. At 420, the UE 115-*e* may transmit a sidelink grant to the UE 115-*d*. The sidelink grant may be in response to the SR received by the UE 115-*e* based on the monitoring. Optionally, at 425, the UE 115-*d* and the UE 115-*e* may perform sidelink communications. In some cases, the sidelink communications may be based on the sidelink grant received by the UE 115-*d* at 420.

Figure 5:
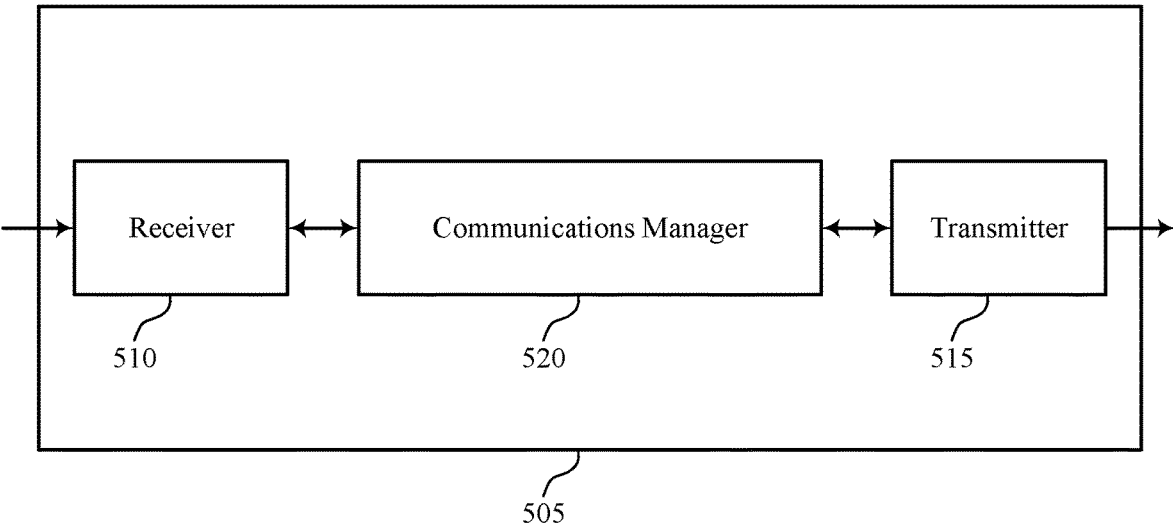
FIGS. 5 and 6 show block diagrams of devices that support compact SRs in sidelink in accordance with aspects of the present disclosure.

FIG. 5 shows a block diagram 500 of a device 505 that supports compact SRs in sidelink in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to compact SRs in sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to compact SRs in sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of compact SRs in sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving a sidelink message from a second UE, the sidelink message indicating a set of feedback resources associated with feedback for the sidelink message, where a timing of the set of feedback resources is based on a TTI in which the sidelink message is received. The communications manager 520 may be configured as or otherwise support a means for transmitting, to the second UE via the set of feedback resources, a SR for sidelink resources for the first UE. The communications manager 520 may be configured as or otherwise support a means for receiving, from the second UE, a grant for the sidelink resources in response to the SR.

Additionally, or alternatively, the communications manager 520 may support wireless communications at a first UE in accordance with examples as disclosed herein. For example, the communications manager 520 may be configured as or otherwise support a means for transmitting, to at least a second UE, a sidelink message in a TTI, the TTI indicating a location of a set of feedback resources associated with feedback for the sidelink message. The communications manager 520 may be configured as or otherwise support a means for monitoring, based on transmitting the sidelink message, the set of feedback resources associated with feedback for the sidelink message. The communications manager 520 may be configured as or otherwise support a means for receiving, based on the monitoring, a SR from the second UE via the set of feedback resources associated with feedback for the sidelink message, the SR including a request for sidelink resources for the second UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of sidelink communication resources.

Figure 6:
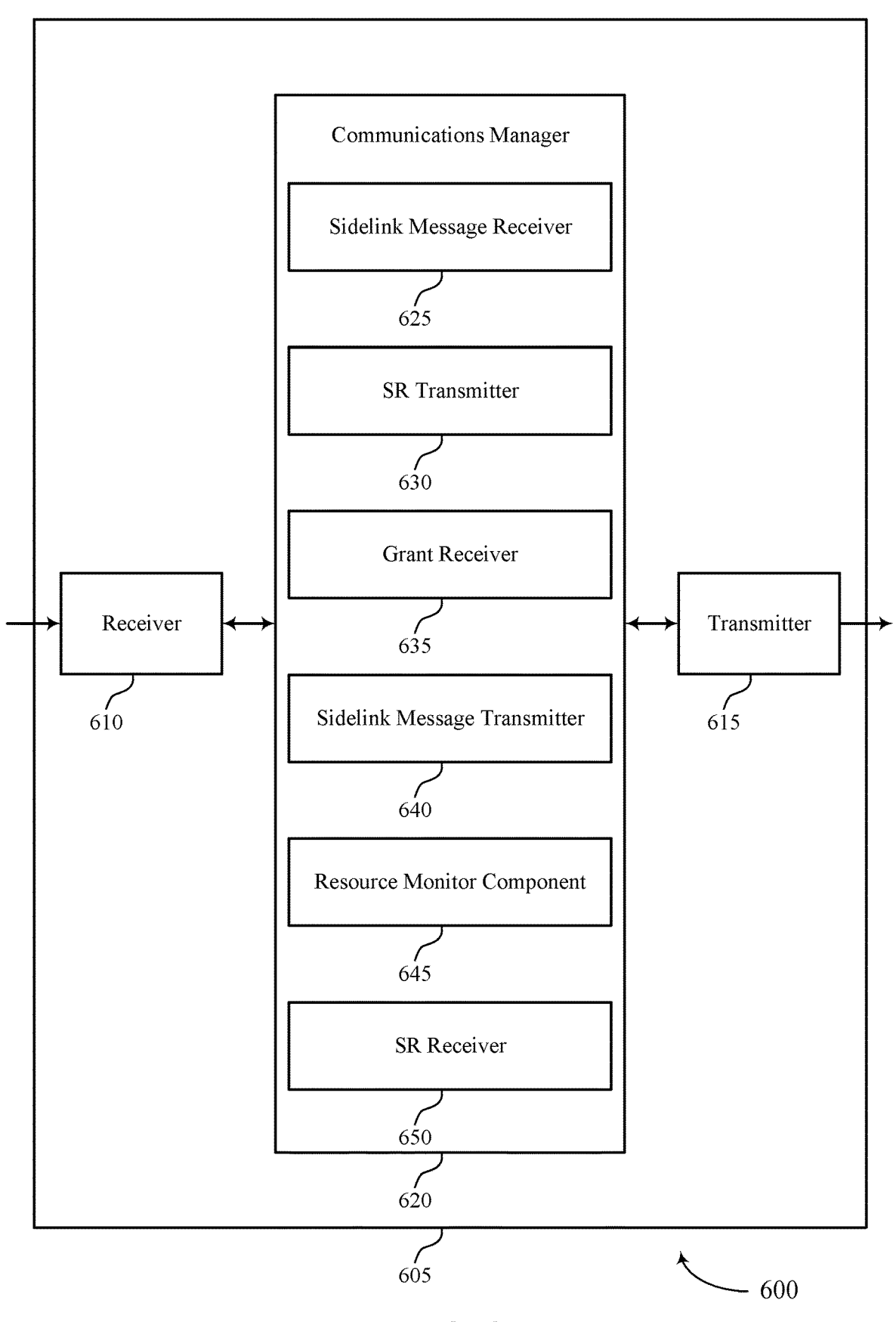

FIG. 6 shows a block diagram 600 of a device 605 that supports compact SRs in sidelink in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to compact SRs in sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to compact SRs in sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of compact SRs in sidelink as described herein. For example, the communications manager 620 may include a sidelink message receiver 625, an SR transmitter 630, a grant receiver 635, a sidelink message transmitter 640, a resource monitor component 645, an SR receiver 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The sidelink message receiver 625 may be configured as or otherwise support a means for receiving a sidelink message from a second UE, the sidelink message indicating a set of feedback resources associated with feedback for the sidelink message, where a timing of the set of feedback resources is based on a TTI in which the sidelink message is received. The SR transmitter 630 may be configured as or otherwise support a means for transmitting, to the second UE via the set of feedback resources, a SR for sidelink resources for the first UE. The grant receiver 635 may be configured as or otherwise support a means for receiving, from the second UE, a grant for the sidelink resources in response to the SR.

Additionally, or alternatively, the communications manager 620 may support wireless communications at a first UE in accordance with examples as disclosed herein. The sidelink message transmitter 640 may be configured as or otherwise support a means for transmitting, to at least a second UE, a sidelink message in a TTI, the TTI indicating a location of a set of feedback resources associated with feedback for the sidelink message. The resource monitor component 645 may be configured as or otherwise support a means for monitoring, based on transmitting the sidelink message, the set of feedback resources associated with feedback for the sidelink message. The SR receiver 650 may be configured as or otherwise support a means for receiving, based on the monitoring, a SR from the second UE via the set of feedback resources associated with feedback for the sidelink message, the SR including a request for sidelink resources for the second UE.

Figure 7:
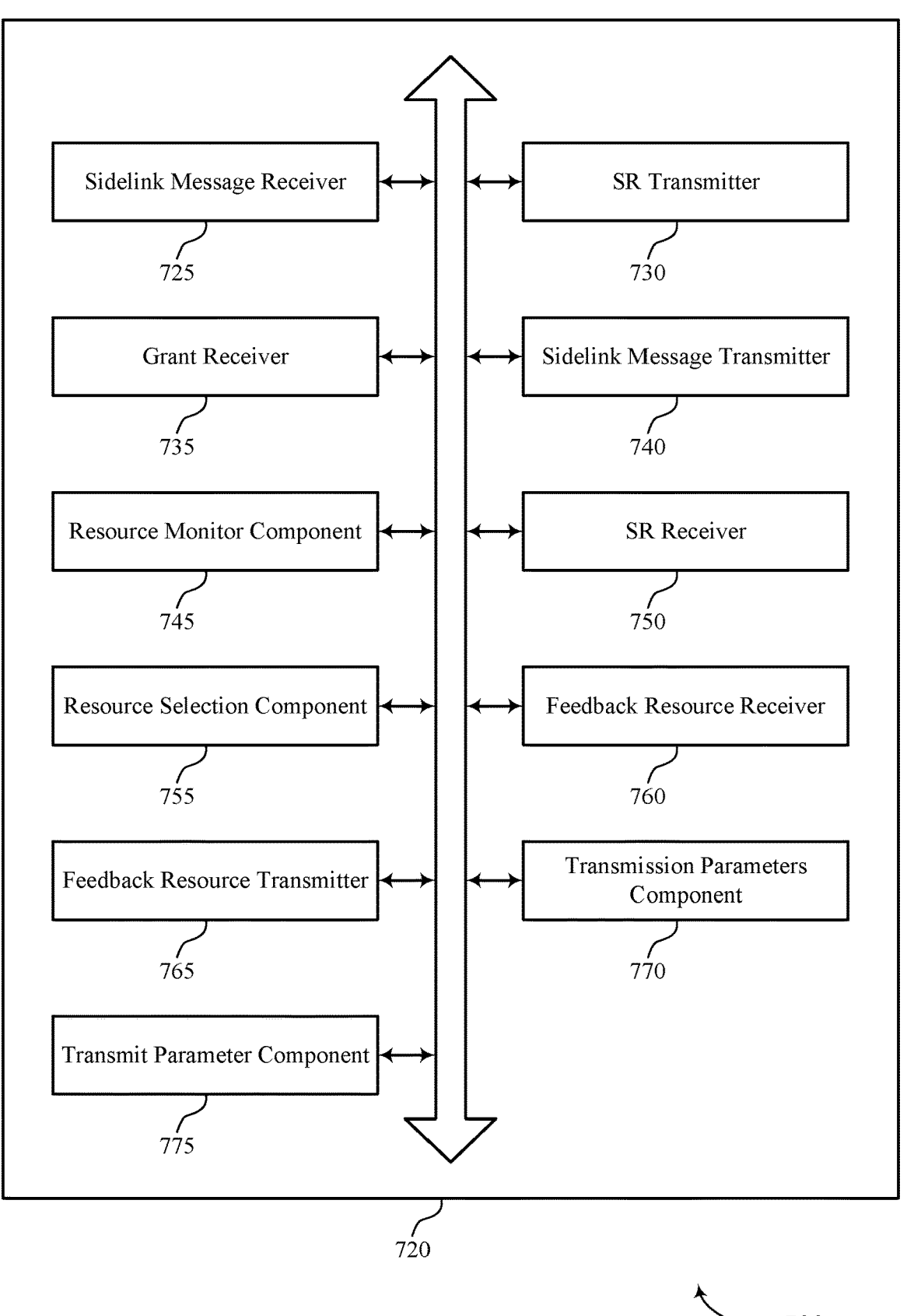
FIG. 7 shows a block diagram of a communications manager that supports compact SRs in sidelink in accordance with aspects of the present disclosure.

FIG. 7 shows a block diagram 700 of a communications manager 720 that supports compact SRs in sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of compact SRs in sidelink as described herein. For example, the communications manager 720 may include a sidelink message receiver 725, an SR transmitter 730, a grant receiver 735, a sidelink message transmitter 740, a resource monitor component 745, an SR receiver 750, a resource selection component 755, a feedback resource receiver 760, a feedback resource transmitter 765, a transmission parameters component 770, a transmit parameter component 775, or any combination thereof. Each of these components may communicate, directly or indirectly, with one another (e.g., via one or more buses).

The communications manager 720 may support wireless communications at a first UE in accordance with examples as disclosed herein. The sidelink message receiver 725 may be configured as or otherwise support a means for receiving a sidelink message from a second UE, the sidelink message indicating a set of feedback resources associated with feedback for the sidelink message, where a timing of the set of feedback resources is based on a TTI in which the sidelink message is received. The SR transmitter 730 may be configured as or otherwise support a means for transmitting, to the second UE via the set of feedback resources, a SR for sidelink resources for the first UE. The grant receiver 735 may be configured as or otherwise support a means for receiving, from the second UE, a grant for the sidelink resources in response to the SR.

In some examples, the resource selection component 755 may be configured as or otherwise support a means for selecting the set of feedback resources from multiple sets of feedback resources associated with the TTI.

In some examples, to support selecting the set of feedback resources, the resource selection component 755 may be configured as or otherwise support a means for selecting the set of feedback resources based on an identifier of the first UE or an assignment configuration associated with the multiple sets of feedback resources.

In some examples, to support selecting the set of feedback resources, the resource selection component 755 may be configured as or otherwise support a means for selecting the set of feedback resources based on a periodicity associated with the first UE, a periodicity associated with the multiple sets of feedback resources, or both.

In some examples, the feedback resource receiver 760 may be configured as or otherwise support a means for receiving an indication of the set of feedback resources to use for transmission of the SR, where the SR is transmitted via the set of feedback resources based on receiving the indication.

In some examples, to support receiving the indication of the set of feedback resources, the feedback resource receiver 760 may be configured as or otherwise support a means for receiving the indication of the set of feedback resources via a PC5 message, an RRC message, MAC-CE, or any combination thereof.

In some examples, the indication of the set of feedback resources includes a second indication of a second set of feedback resources in a second TTI subsequent the set of feedback resources, the second set of feedback resources corresponding to a subsequent SR occasion for the first UE.

In some examples, to support transmitting the SR, the SR transmitter 730 may be configured as or otherwise support a means for transmitting the SR according to a set of transmission parameters associated with the first UE, the set of feedback resources, or both.

In some examples, the transmission parameters component 770 may be configured as or otherwise support a means for receiving an indication of the set of transmission parameters from the second UE via a PC5 message, an RRC message, a UE assistance framework message, or any combination thereof.

In some examples, the set of transmission parameters is specific to the first UE or a set of UEs including the first UE.

In some examples, the set of transmission parameters includes a destination identifier, a packet delay budget, a priority level, a number of retransmissions, a transport block size, a number of sub-channels, or any combination thereof.

In some examples, the set of feedback resources is allocated to a set of UEs including the first UE.

In some examples, the sidelink message includes a second grant for second sidelink resources for the first UE, a data message for the first UE, a trigger for the SR, or any combination thereof.

Additionally, or alternatively, the communications manager 720 may support wireless communications at a first UE in accordance with examples as disclosed herein. The sidelink message transmitter 740 may be configured as or otherwise support a means for transmitting, to at least a second UE, a sidelink message in a TTI, the TTI indicating a location of a set of feedback resources associated with feedback for the sidelink message. The resource monitor component 745 may be configured as or otherwise support a means for monitoring, based on transmitting the sidelink message, the set of feedback resources associated with feedback for the sidelink message. The SR receiver 750 may be configured as or otherwise support a means for receiving, based on the monitoring, a SR from the second UE via the set of feedback resources associated with feedback for the sidelink message, the SR including a request for sidelink resources for the second UE.

In some examples, to support monitoring the set of feedback resources, the resource monitor component 745 may be configured as or otherwise support a means for monitoring the set of feedback resources of multiple sets of feedback resources associated with the TTI based on an identifier of the second UE or an assignment configuration associated with the multiple sets of feedback resources.

In some examples, to support monitoring the set of feedback resources, the resource monitor component 745 may be configured as or otherwise support a means for monitoring the set of feedback resources of multiple sets of feedback resources associated with the TTI based on a periodicity associated with the second UE, a periodicity associated with the multiple sets of feedback resources, or both.

In some examples, the feedback resource transmitter 765 may be configured as or otherwise support a means for transmitting, to the second UE, an indication of the set of feedback resources to use for transmission of the SR, where the SR is received via the set of feedback resources based on the indication.

In some examples, to support transmitting the indication, the feedback resource transmitter 765 may be configured as or otherwise support a means for transmitting the indication of the set of feedback resources via a PC5 message, an RRC message, a MAC-CE, or any combination thereof.

In some examples, the indication of the set of feedback resources includes a second indication of a second set of feedback resources in a second TTI subsequent the set of feedback resources, the second set of feedback resources corresponding to a subsequent SR occasion for the second UE.

In some examples, the SR receiver 750 may be configured as or otherwise support a means for receiving the SR according to a set of transmission parameters associated with the second UE, the set of feedback resources, or both.

In some examples, the transmit parameter component 775 may be configured as or otherwise support a means for transmitting an indication of the set of transmission parameters from the second UE via a PC5 message, an RRC message, a UE assistance framework message, or any combination thereof.

In some examples, the set of transmission parameters includes a destination identifier, a packet delay budget, a priority level, a number of retransmissions, a transport block size, a number of sub-channels, or any combination thereof.

In some examples, the set of feedback resources is allocated to a set of UEs including the second UE.

In some examples, the sidelink message includes a second grant for second sidelink resources for the second UE, a data message for the second UE, a trigger for the SR, or any combination thereof.

Figure 8:
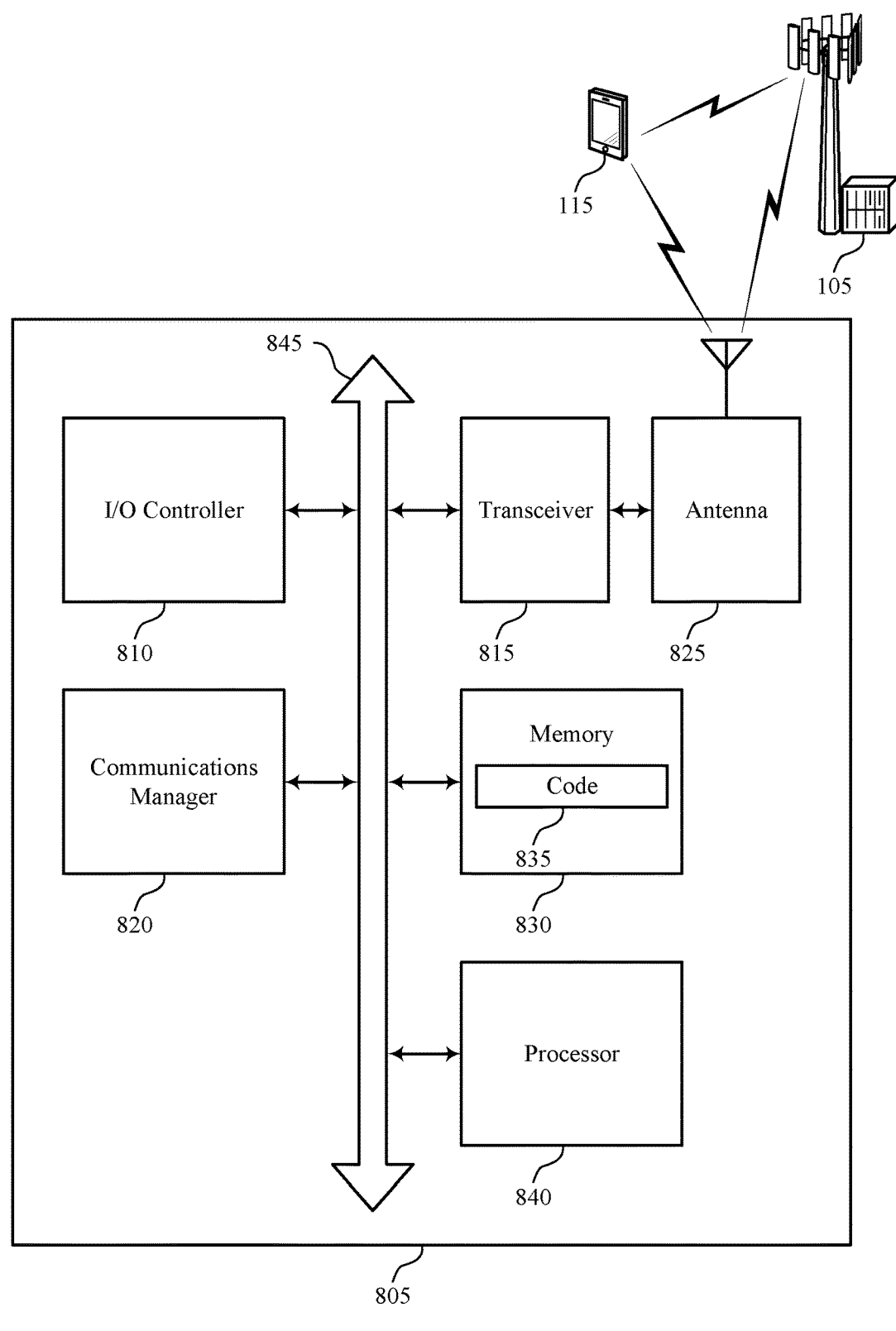
FIG. 8 shows a diagram of a system including a device that supports compact SRs in sidelink in accordance with aspects of the present disclosure.

FIG. 8 shows a diagram of a system 800 including a device 805 that supports compact SRs in sidelink in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting compact SRs in sidelink). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving a sidelink message from a second UE, the sidelink message indicating a set of feedback resources associated with feedback for the sidelink message, where a timing of the set of feedback resources is based on a TTI in which the sidelink message is received. The communications manager 820 may be configured as or otherwise support a means for transmitting, to the second UE via the set of feedback resources, a SR for sidelink resources for the first UE. The communications manager 820 may be configured as or otherwise support a means for receiving, from the second UE, a grant for the sidelink resources in response to the SR.

Additionally, or alternatively, the communications manager 820 may support wireless communications at a first UE in accordance with examples as disclosed herein. For example, the communications manager 820 may be configured as or otherwise support a means for transmitting, to at least a second UE, a sidelink message in a TTI, the TTI indicating a location of a set of feedback resources associated with feedback for the sidelink message. The communications manager 820 may be configured as or otherwise support a means for monitoring, based on transmitting the sidelink message, the set of feedback resources associated with feedback for the sidelink message. The communications manager 820 may be configured as or otherwise support a means for receiving, based on the monitoring, a SR from the second UE via the set of feedback resources associated with feedback for the sidelink message, the SR including a request for sidelink resources for the second UE.

By including or configuring the communications manager 820 in accordance with examples as described herein, the device 805 may support techniques for more efficient utilization of sidelink communication resources, improved coordination between devices, and reduced latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of compact SRs in sidelink as described herein, or the processor 840 and the memory 830 may be otherwise configured to perform or support such operations.

FIG. 9 shows a flowchart illustrating a method 900 that supports compact SRs in sidelink in accordance with aspects of the present disclosure. The operations of the method 900 may be implemented by a wireless device or its components as described herein. For example, the operations of the method 900 may be performed by a UE 115 as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 905, the method may include receiving a sidelink message from a second wireless device, the sidelink message indicating a set of feedback resources associated with the sidelink message, where a timing of the set of feedback resources is based on a TTI in which the sidelink message is received. The operations of 905 may be performed in accordance with examples as disclosed herein. In some examples, aspects of the operations of 905 may be performed by a sidelink message receiver 725 as described with reference to FIG. 7.

At 910, the method may include transmitting, to the second wireless device via the set of feedback resources, a SR for sidelink resources for the first wireless device. The operations of 910 may be performed in accordance with examples as disclosed herein. In some examples, aspects of the operations of 910 may be performed by an SR transmitter 730 as described with reference to FIG. 7.

At 915, the method may include receiving, from the second wireless device, a grant for the sidelink resources in response to the SR. The operations of 915 may be performed in accordance with examples as disclosed herein. In some examples, aspects of the operations of 915 may be performed by a grant receiver 735 as described with reference to FIG. 7.

FIG. 10 shows a flowchart illustrating a method 1000 that supports compact SRs in sidelink in accordance with aspects of the present disclosure. The operations of the method 1000 may be implemented by a wireless device or its components as described herein. For example, the operations of the method 1000 may be performed by a UE 115 as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1005, the method may include receiving a sidelink message from a second wireless device, the sidelink message indicating a set of feedback resources associated with the sidelink message, where a timing of the set of feedback resources is based on a TTI in which the sidelink message is received. The operations of 1005 may be performed in accordance with examples as disclosed herein. In some examples, aspects of the operations of 1005 may be performed by a sidelink message receiver 725 as described with reference to FIG. 7.

At 1010, the method may include selecting the set of feedback resources from multiple sets of feedback resources associated with the TTI. The operations of 1010 may be performed in accordance with examples as disclosed herein. In some examples, aspects of the operations of 1010 may be performed by a resource selection component 755 as described with reference to FIG. 7.

At 1015, the method may include transmitting, to the second wireless device via the set of feedback resources, a SR for sidelink resources for the first wireless device. The operations of 1015 may be performed in accordance with examples as disclosed herein. In some examples, aspects of the operations of 1015 may be performed by an SR transmitter 730 as described with reference to FIG. 7.

At 1020, the method may include receiving, from the second wireless device, a grant for the sidelink resources in response to the SR. The operations of 1020 may be performed in accordance with examples as disclosed herein. In some examples, aspects of the operations of 1020 may be performed by a grant receiver 735 as described with reference to FIG. 7.

FIG. 11 shows a flowchart illustrating a method 1100 that supports compact SRs in sidelink in accordance with aspects of the present disclosure. The operations of the method 1100 may be implemented by a wireless device or its components as described herein. For example, the operations of the method 1100 may be performed by a UE 115 as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1105, the method may include receiving an indication of a set of feedback resources to use for transmission of a SR. The operations of 1105 may be performed in accordance with examples as disclosed herein. In some examples, aspects of the operations of 1105 may be performed by a feedback resource receiver 760 as described with reference to FIG. 7.

At 1110, the method may include receiving a sidelink message from a second wireless device, the sidelink message indicating the set of feedback resources associated with the sidelink message, where a timing of the set of feedback resources is based on a TTI in which the sidelink message is received. The operations of 1110 may be performed in accordance with examples as disclosed herein. In some examples, aspects of the operations of 1110 may be performed by a sidelink message receiver 725 as described with reference to FIG. 7.

At 1115, the method may include transmitting, to the second wireless device via the set of feedback resources, the SR for sidelink resources for the first wireless device. The operations of 1115 may be performed in accordance with examples as disclosed herein. In some examples, aspects of the operations of 1115 may be performed by an SR transmitter 730 as described with reference to FIG. 7.

At 1120, the method may include receiving, from the second wireless device, a grant for the sidelink resources in response to the SR. The operations of 1120 may be performed in accordance with examples as disclosed herein. In some examples, aspects of the operations of 1120 may be performed by a grant receiver 735 as described with reference to FIG. 7.

FIG. 12 shows a flowchart illustrating a method 1200 that supports compact SRs in sidelink in accordance with aspects of the present disclosure. The operations of the method 1200 may be implemented by a wireless device or its components as described herein. For example, the operations of the method 1200 may be performed by a UE 115 as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1205, the method may include transmitting, to at least a second wireless device, a sidelink message in a TTI, the TTI indicating a location of a set of feedback resources associated with the sidelink message. The operations of 1205 may be performed in accordance with examples as disclosed herein. In some examples, aspects of the operations of 1205 may be performed by a sidelink message transmitter 740 as described with reference to FIG. 7.

At 1210, the method may include monitoring, based on transmitting the sidelink message, the set of feedback resources associated with the sidelink message. The operations of 1210 may be performed in accordance with examples as disclosed herein. In some examples, aspects of the operations of 1210 may be performed by a resource monitor component 745 as described with reference to FIG. 7.

At 1215, the method may include receiving, based on the monitoring, a SR from the second wireless device via the set of feedback resources associated with the sidelink message, the SR including a request for sidelink resources for the second wireless device. The operations of 1215 may be performed in accordance with examples as disclosed herein. In some examples, aspects of the operations of 1215 may be performed by an SR receiver 750 as described with reference to FIG. 7.

FIG. 13 shows a flowchart illustrating a method 1300 that supports compact SRs in sidelink in accordance with aspects of the present disclosure. The operations of the method 1300 may be implemented by a wireless device or its components as described herein. For example, the operations of the method 1300 may be performed by a UE 115 as described with reference to FIGS. 1 through 8. In some examples, a wireless device may execute a set of instructions to control the functional elements of the wireless device to perform the described functions. Additionally, or alternatively, the wireless device may perform aspects of the described functions using special-purpose hardware.

At 1305, the method may include transmitting, to a second wireless device, an indication of a set of feedback resources to use for transmission of a SR. The operations of 1305 may be performed in accordance with examples as disclosed herein. In some examples, aspects of the operations of 1305 may be performed by a feedback resource transmitter 765 as described with reference to FIG. 7.

At 1310, the method may include transmitting, to at least the second wireless device, a sidelink message in a TTI, the TTI indicating a location of the set of feedback resources associated with the sidelink message. The operations of 1310 may be performed in accordance with examples as disclosed herein. In some examples, aspects of the operations of 1310 may be performed by a sidelink message transmitter 740 as described with reference to FIG. 7.

At 1315, the method may include monitoring, based on transmitting the sidelink message, the set of feedback resources associated with the sidelink message. The operations of 1315 may be performed in accordance with examples as disclosed herein. In some examples, aspects of the operations of 1315 may be performed by a resource monitor component 745 as described with reference to FIG. 7.

At 1320, the method may include receiving, based on the monitoring, the SR from the second wireless device via the set of feedback resources associated with the sidelink message, the SR including a request for sidelink resources for the second wireless device. The operations of 1320 may be performed in accordance with examples as disclosed herein. In some examples, aspects of the operations of 1320 may be performed by an SR receiver 750 as described with reference to FIG. 7.

The following provides an overview of aspects of the present disclosure:

Aspect 1: A method for wireless communications at a first wireless device, comprising: receiving a sidelink message from a second wireless device, the sidelink message indicating a set of feedback resources associated with the sidelink message, wherein a timing of the set of feedback resources is based at least in part on a TTI in which the sidelink message is received; transmitting, to the second wireless device via the set of feedback resources, a SR for sidelink resources for the first wireless device; and receiving, from the second wireless device, a grant for the sidelink resources in response to the SR.

Aspect 2: The method of aspect 1, further comprising: selecting the set of feedback resources from multiple sets of feedback resources associated with the TTI.

Aspect 3: The method of aspect 2, wherein selecting the set of feedback resources comprises: selecting the set of feedback resources based at least in part on an identifier of the first wireless device or an assignment configuration associated with the multiple sets of feedback resources.

Aspect 4: The method of any of aspects 2 through 3, wherein selecting the set of feedback resources comprises: selecting the set of feedback resources based at least in part on a periodicity associated with the first wireless device, a periodicity associated with the multiple sets of feedback resources, or both.

Aspect 5: The method of any of aspects 1 through 4, further comprising: receiving an indication of the set of feedback resources to use for transmission of the SR, wherein the SR is transmitted via the set of feedback resources based at least in part on receiving the indication.

Aspect 6: The method of aspect 5, wherein receiving the indication of the set of feedback resources comprises: receiving the indication of the set of feedback resources via a PC5 message, an RRC message, a medium access control (MAC) control element (MAC-CE), or any combination thereof.

Aspect 7: The method of any of aspects 5 through 6, wherein the indication of the set of feedback resources comprises a second indication of a second set of feedback resources in a second TTI subsequent the set of feedback resources, the second set of feedback resources corresponding to a subsequent SR occasion for the first wireless device.

Aspect 8: The method of any of aspects 1 through 7, wherein transmitting the SR comprises: transmitting the SR according to a set of transmission parameters associated with the first wireless device, the set of feedback resources, or both.

Aspect 9: The method of aspect 8, further comprising: receiving an indication of the set of transmission parameters from the second wireless device via a PC5 message, an RRC message, a UE assistance framework message, or any combination thereof.

Aspect 10: The method of any of aspects 8 through 9, wherein the set of transmission parameters is specific to the first wireless device or a set of wireless devices including the first wireless device.

Aspect 11: The method of any of aspects 8 through 10, wherein the set of transmission parameters comprises a destination identifier, a packet delay budget, a priority level, a number of retransmissions, a transport block size, a number of sub-channels, or any combination thereof.

Aspect 12: The method of any of aspects 1 through 11, wherein the set of feedback resources is allocated to a set of wireless devices including the first wireless device.

Aspect 13: The method of any of aspects 1 through 12, wherein the sidelink message comprises a second grant for second sidelink resources for the first wireless device, a data message for the first wireless device, a trigger for the SR, or any combination thereof.

Aspect 14: A method for wireless communications at a first wireless device, comprising: transmitting, to at least a second wireless device, a sidelink message in a TTI, the TTI indicating a location of a set of feedback resources associated with the sidelink message; monitoring, based at least in part on transmitting the sidelink message, the set of feedback resources associated with the sidelink message; and receiving, based at least in part on the monitoring, a SR from the second wireless device via the set of feedback resources associated with the sidelink message, the SR comprising a request for sidelink resources for the second wireless device.

Aspect 15: The method of aspect 14, wherein monitoring the set of feedback resources comprises: monitoring the set of feedback resources of multiple sets of feedback resources associated with the TTI based at least in part on an identifier of the second wireless device or an assignment configuration associated with the multiple sets of feedback resources.

Aspect 16: The method of any of aspects 14 through 15, wherein monitoring the set of feedback resources comprises: monitoring the set of feedback resources of multiple sets of feedback resources associated with the TTI based at least in part on a periodicity associated with the second wireless device, a periodicity associated with the multiple sets of feedback resources, or both.

Aspect 17: The method of any of aspects 14 through 16, further comprising: transmitting, to the second wireless device, an indication of the set of feedback resources to use for transmission of the SR, wherein the SR is received via the set of feedback resources based at least in part on the indication.

Aspect 18: The method of aspect 17, wherein transmitting the indication comprises: transmitting the indication of the set of feedback resources via a PC5 message, an RRC message, a medium access control (MAC) control element (MAC-CE), or any combination thereof.

Aspect 19: The method of aspect 18, wherein the indication of the set of feedback resources comprises a second indication of a second set of feedback resources in a second TTI subsequent the set of feedback resources, the second set of feedback resources corresponding to a subsequent SR occasion for the second wireless device.

Aspect 20: The method of any of aspects 14 through 19, further comprising: receiving the SR according to a set of transmission parameters associated with the second wireless device, the set of feedback resources, or both.

Aspect 21: The method of aspect 20, further comprising: transmitting an indication of the set of transmission parameters from the second wireless device via a PC5 message, an RRC message, a UE assistance framework message, or any combination thereof.

Aspect 22: The method of any of aspects 20 through 21, wherein the set of transmission parameters comprises a destination identifier, a packet delay budget, a priority level, a number of retransmissions, a transport block size, a number of sub-channels, or any combination thereof.

Aspect 23: The method of any of aspects 14 through 22, wherein the set of feedback resources is allocated to a set of wireless devices including the second wireless device.

Aspect 24: The method of any of aspects 14 through 23, wherein the sidelink message comprises a second grant for second sidelink resources for the second wireless device, a data message for the second wireless device, a trigger for the SR, or any combination thereof.

Aspect 25: An apparatus for wireless communications at a first wireless device, comprising a processor; memory coupled with the processor; and instructions stored in the memory and executable by the processor to cause the apparatus to perform a method of any of aspects 1 through 13.

Aspect 26: An apparatus for wireless communications at a first wireless device, comprising at least one means for performing a method of any of aspects 1 through 13.

Aspect 27: A non-transitory computer-readable medium storing code for wireless communications at a first wireless device, the code comprising instructions executable by a processor to perform a method of any of aspects 1 through 13.

Aspect 28: An apparatus for wireless communications at a first wireless device, comprising a processor; memory coupled with the processor; and instructions stored in the memory and executable by the processor to cause the apparatus to perform a method of any of aspects 14 through 24.

Aspect 29: An apparatus for wireless communications at a first wireless device, comprising at least one means for performing a method of any of aspects 14 through 24.

Aspect 30: A non-transitory computer-readable medium storing code for wireless communications at a first wireless device, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a second wireless device, a sidelink data message comprising data for the first wireless device and a trigger for a scheduling request, and indicating a set of feedback resources associated with the sidelink data message, wherein a timing of the set of feedback resources is based at least in part on a transmission time interval in which the sidelink data message is received;
   transmitting, to the second wireless device via the set of feedback resources based at least in part on receiving the sidelink data message, the scheduling request for sidelink resources for the first wireless device; and
   receiving, from the second wireless device, a grant for the sidelink resources in response to the scheduling request.

2. The method of claim 1, further comprising:
   selecting the set of feedback resources from multiple sets of feedback resources of a second transmission time interval that is associated with the transmission time interval.

3. The method of claim 2, wherein selecting the set of feedback resources comprises:
   selecting the set of feedback resources based at least in part on an identifier of the first wireless device or an assignment configuration associated with the multiple sets of feedback resources.

4. The method of claim 2, wherein selecting the set of feedback resources comprises:
   selecting the set of feedback resources based at least in part on a first periodicity associated with the first wireless device, a second periodicity associated with the multiple sets of feedback resources, or both.

5. The method of claim 1, further comprising:
   receiving an indication of the set of feedback resources indicated in the sidelink data message to use for transmission of the scheduling request, wherein the scheduling request is transmitted via the set of feedback resources based at least in part on receiving the indication.

6. The method of claim 5, wherein receiving the indication of the set of feedback resources comprises:

receiving the indication of the set of feedback resources via a PC5 message, a radio resource control (RRC) message, a medium access control (MAC) control element (MAC-CE), or any combination thereof.

7. The method of claim 5, wherein the indication of the set of feedback resources comprises a second indication of a second set of feedback resources in a second transmission time interval subsequent the set of feedback resources, the second set of feedback resources corresponding to a subsequent scheduling request occasion for the first wireless device.

8. The method of claim 1, wherein transmitting the scheduling request comprises:

transmitting the scheduling request according to a set of transmission parameters associated with the first wireless device, the set of feedback resources, or both.

9. The method of claim 8, further comprising:

receiving an indication of the set of transmission parameters from the second wireless device via a PC5 message, a radio resource control (RRC) message, a UE assistance framework message, or any combination thereof.

10. The method of claim 8, wherein the set of transmission parameters is specific to the first wireless device or a set of wireless devices including the first wireless device.

11. The method of claim 8, wherein the set of transmission parameters comprises a destination identifier, a packet delay budget, a priority level, a number of retransmissions, a transport block size, a number of sub-channels, or any combination thereof.

12. The method of claim 1, wherein the set of feedback resources is allocated to a set of wireless devices including the first wireless device.

13. The method of claim 1, wherein the sidelink data message comprises a second grant for second sidelink resources for the first wireless device.

14. A first wireless device for wireless communications, comprising:

one or more processors;

one or more memories coupled with the one or more processors; and instructions stored in the one or more memories and executable by the one or more processors to cause the first wireless device to:

receive, from a second wireless device, a sidelink data message comprising data for the first wireless device and a trigger for a scheduling request, and indicating a set of feedback resources associated with the sidelink data message, wherein a timing of the set of feedback resources is based at least in part on a transmission time interval in which the sidelink data message is received;

transmit, to the second wireless device via the set of feedback resources based at least in part on receiving the sidelink data message indicating the set of feedback resources, the scheduling request for sidelink resources for the first wireless device; and receive, from the second wireless device, a grant for the sidelink resources in response to the scheduling request.

15. The first wireless device of claim 14, wherein the instructions are further executable by the one or more processors to cause the first wireless device to:

select the set of feedback resources from multiple sets of feedback resources of a second transmission time interval that is associated with the transmission time interval.

16. The first wireless device of claim 15, wherein the instructions are further executable by the one or more processors to cause the first wireless device to:

select the set of feedback resources based at least in part on an identifier of the first wireless device or an assignment configuration associated with the multiple sets of feedback resources.

17. The first wireless device of claim 15, wherein the instructions are further executable by the one or more processors to cause the first wireless device to:

select the set of feedback resources based at least in part on a first periodicity associated with the first wireless device, a second periodicity associated with the multiple sets of feedback resources, or both.

18. The first wireless device of claim 14, wherein the instructions are further executable by the one or more processors to cause the first wireless device to:

receive an indication of the set of feedback resources indicated in the sidelink data message to use for transmission of the scheduling request, wherein the scheduling request is transmitted via the set of feedback resources based at least in part on receiving the indication.

19. The first wireless device of claim 18, wherein the instructions are further executable by the one or more processors to cause the first wireless device to:

receive the indication of the set of feedback resources via a PC5 message, a radio resource control (RRC) message, a medium access control (MAC) control element (MAC-CE), or any combination thereof.

20. The first wireless device of claim 18, wherein the indication of the set of feedback resources comprises a second indication of a second set of feedback resources in a second transmission time interval subsequent the set of feedback resources, the second set of feedback resources corresponding to a subsequent scheduling request occasion for the first wireless device.

21. The first wireless device of claim 14, wherein the instructions are further executable by the one or more processors to cause the first wireless device to:

transmit the scheduling request according to a set of transmission parameters associated with the first wireless device, the set of feedback resources, or both.

22. The first wireless device of claim 21, wherein the instructions are further executable by the one or more processors to cause the first wireless device to:

receive an indication of the set of transmission parameters from the second wireless device via a PC5 message, a radio resource control (RRC) message, a UE assistance framework message, or any combination thereof.

23. The first wireless device of claim 21, wherein the set of transmission parameters is specific to the first wireless device or a set of wireless devices including the first wireless device.

24. The first wireless device of claim 21, wherein the set of transmission parameters comprises a destination identifier, a packet delay budget, a priority level, a number of retransmissions, a transport block size, a number of sub-channels, or any combination thereof.

25. The first wireless device of claim 14, wherein the set of feedback resources is allocated to a set of wireless devices including the first wireless device.

26. The first wireless device of claim 14, wherein the sidelink data message comprises a second grant for second sidelink resources for the first wireless device.

27. A non-transitory computer-readable medium storing code for wireless communications at a first wireless device, the code comprising instructions executable by one or more processors to:

receive, from a second wireless device, a sidelink data message comprising data for the first wireless device and a trigger for a scheduling request, and indicating a set of feedback resources associated with the sidelink data message, wherein a timing of the set of feedback resources is based at least in part on a transmission time interval in which the sidelink data message is received;

transmit, to the second wireless device via the set of feedback resources based at least in part on receiving the sidelink data message indicating the set of feedback resources, the scheduling request for sidelink resources for the first wireless device; and receive, from the second wireless device, a grant for the sidelink resources in response to the scheduling request.

28. The non-transitory computer-readable medium of claim 27, wherein the instructions are further executable by the one or more processors to:

select the set of feedback resources from multiple sets of feedback resources of a second transmission time interval that is associated with the transmission time interval.

29. The non-transitory computer-readable medium of claim 27, wherein the instructions are further executable by the one or more processors to:

receive an indication of the set of feedback resources indicated in the sidelink data message to use for transmission of the scheduling request, wherein the scheduling request is transmitted via the set of feedback resources based at least in part on receiving the indication.

30. A first wireless device for wireless communications, comprising:

means for receiving, from a second wireless device, a sidelink data message comprising data for the first wireless device and a trigger for a scheduling request, and indicating a set of feedback resources associated with the sidelink data message, wherein a timing of the set of feedback resources is based at least in part on a transmission time interval in which the sidelink data message is received;

means for transmitting, to the second wireless device via the set of feedback resources based at least in part on receiving the sidelink data message indicating the set of feedback resources, the scheduling request for sidelink resources for the first wireless device; and means for receiving, from the second wireless device, a grant for the sidelink resources in response to the scheduling request.

* * * * *